US012227007B2

(12) United States Patent
Ochi

(10) Patent No.: US 12,227,007 B2
(45) Date of Patent: Feb. 18, 2025

(54) LIQUID EJECTING APPARATUS AND METHOD FOR CONTROLLING LIQUID EJECTING APPARATUS

(71) Applicant: SEIKO EPSON CORPORATION, Tokyo (JP)

(72) Inventor: Kazuhiro Ochi, Nagano (JP)

(73) Assignee: SEIKO EPSON CORPORATION (JP)

( * ) Notice: Subject to any disclaimer, the term of this patent is extended or adjusted under 35 U.S.C. 154(b) by 160 days.

(21) Appl. No.: 18/180,191

(22) Filed: Mar. 8, 2023

(65) Prior Publication Data

US 2023/0286269 A1 Sep. 14, 2023

(30) Foreign Application Priority Data

Mar. 9, 2022 (JP) ................................ 2022-035991

(51) Int. Cl.
*B41J 2/045* (2006.01)
*B41J 2/14* (2006.01)

(52) U.S. Cl.
CPC ....... *B41J 2/04588* (2013.01); *B41J 2/04541* (2013.01); *B41J 2/04563* (2013.01); *B41J 2/04571* (2013.01); *B41J 2/04581* (2013.01); *B41J 2/04596* (2013.01); *B41J 2/14233* (2013.01); *B41J 2002/14354* (2013.01); *B41J 2002/14491* (2013.01)

(58) Field of Classification Search
CPC ................ B41J 2/04588; B41J 2/04541; B41J 2/04563; B41J 2/04571; B41J 2/04581; B41J 2/04596; B41J 2/14233; B41J 2002/14354; B41J 2002/14491
See application file for complete search history.

(56) References Cited

U.S. PATENT DOCUMENTS

| | | | | |
|---|---|---|---|---|
| 6,488,349 B1 * | 12/2002 | Matsuo | B41J 2/04581 347/11 |
| 7,073,727 B2 * | 7/2006 | Usuda | B41J 2/04588 239/69 |
| 2009/0244135 A1 * | 10/2009 | Kaieda | B41J 2/04581 347/10 |

FOREIGN PATENT DOCUMENTS

JP 2001146011 A 5/2001

* cited by examiner

*Primary Examiner* — Henok D Legesse
(74) *Attorney, Agent, or Firm* — Harness, Dickey & Pierce, P.L.C.

(57) ABSTRACT

A liquid ejecting apparatus is configured to drive a drive element that is driven in accordance with a drive signal for ejecting a plurality of liquid droplets such that the liquid droplets merge together before landing onto a medium. The drive signal includes a plurality of drive waveforms and a first connection waveform that is continuous from a second-to-last drive waveform and continuous to a last drive waveform and along which a potential of the drive signal is kept at a reference level. Pressure changes caused by the contraction waveform of the last drive waveform in a liquid present inside the pressure compartment are larger than pressure changes caused by the contraction waveform of the second-to-last drive waveform in the liquid present inside the pressure compartment. A period of the first connection waveform is 0.8 or more times as long as a natural vibration cycle of the ejecting portion.

10 Claims, 9 Drawing Sheets

FIG. 7

| PERIOD OF CONNECTION WAVEFORM | 0.6 | 0.7 | 0.8 | 0.9 | 1.0 | 1.1 | 1.2 | 1.3 | 1.4 | 1.5 |
|---|---|---|---|---|---|---|---|---|---|---|
| STABILITY OF SECOND SHOT | D | D | B | B | A | A | A | A | A | A |
| MERGING | C | A | A | A | A | A | B | C | C | C |

STABILITY: A: STABLE EJECTION B: WITHIN TOLERABLE RANGE
D: DEVIATION IN EJECTION OCCURRED

MERGING: A: MERGE WITHIN DISTANCE OF 0.5 MM FROM NOZZLE SURFACE
B: MERGE WITHIN DISTANCE OF 1 MM FROM NOZZLE SURFACE
C: NOT MERGE WITHIN DISTANCE OF 1 MM FROM NOZZLE SURFACE

LIQUID EJECTING APPARATUS AND METHOD FOR CONTROLLING LIQUID EJECTING APPARATUS

The present application is based on, and claims priority from JP Application Serial Number 2022-035991, filed Mar. 9, 2022, the disclosure of which is hereby incorporated by reference herein in its entirety.

BACKGROUND

1. Technical Field

Embodiments of the present disclosure relate to a liquid ejecting apparatus and a method for controlling a liquid ejecting apparatus.

2. Related Art

A liquid ejecting apparatus that prints an image by ejecting a liquid such as ink from a plurality of nozzles by using piezoelectric elements is known. In a liquid ejecting apparatus of this kind, for example, a piezoelectric element causes a pressure compartment that is in communication with a nozzle to contract in accordance with a drive signal that includes a pulse for ejecting ink from the nozzle, thereby ejecting the ink present inside the pressure compartment from the nozzle. Also known as a method for controlling a liquid ejecting apparatus is a method of supplying a plurality of pulses to piezoelectric elements and causing a plurality of liquid droplets ejected from each nozzle to merge together before landing onto a surface of a print medium. For example, JP-A-2001-146011 discloses an ink-jet head that selects a plurality of ink-ejecting pulse signals for driving an actuator including a piezoelectric element from pulse signals generated successively in a reference driving signal.

In a control method of related art in which pulses are supplied successively to a piezoelectric element, the speed of a liquid droplet ejected due to being driven by a succeeding pulse is increased by synthesizing residual vibration of pressure changes caused by a preceding pulse inside a pressure compartment with pressure changes caused by the succeeding pulse inside the pressure compartment. Therefore, in such a control method of related art, the ejection of a liquid droplet due to being driven by a succeeding pulse could be unstable when the behavior of residual vibration caused by a preceding pulse changes.

SUMMARY

A liquid ejecting apparatus according to a certain aspect of the present disclosure includes: a plurality of ejecting portions each including a nozzle from which droplet ejection is performed, a pressure compartment that is in communication with the nozzle, and a drive element; and a signal generation unit that generates, as a drive signal of the drive element, a signal for ejecting a plurality of liquid droplets from the nozzle such that the liquid droplets merge together before landing onto a medium, wherein the drive signal includes a plurality of drive waveforms for causing pressure changes in a liquid present inside the pressure compartment, and a first connection waveform that is continuous from a second-to-last drive waveform and continuous to a last drive waveform among the plurality of drive waveforms and along which a potential of the drive signal is kept at a reference level, each of the plurality of drive waveforms includes an expansion waveform along which the potential of the drive signal changes from the reference level such that capacity of the pressure compartment expands, and a contraction waveform along which the potential of the drive signal changes so as to eject a liquid droplet from the nozzle by causing the capacity of the pressure compartment expanded by the expansion waveform to contract, pressure changes caused by the contraction waveform of the last drive waveform in the liquid present inside the pressure compartment are larger than pressure changes caused by the contraction waveform of the second-to-last drive waveform in the liquid present inside the pressure compartment, and a period of the first connection waveform is 0.8 or more times as long as a natural vibration cycle of the ejecting portion.

Another aspect of the present disclosure is a method for controlling a liquid ejecting apparatus including a plurality of ejecting portions, each of the plurality of ejecting portions including a nozzle from which droplet ejection is performed, a pressure compartment that is in communication with the nozzle, and a drive element, the method comprising: generating, as a drive signal of the drive element, a signal for ejecting a plurality of liquid droplets from the nozzle such that the liquid droplets merge together before landing onto a medium, wherein the drive signal includes a plurality of drive waveforms for causing pressure changes in a liquid present inside the pressure compartment, and a first connection waveform that is continuous from a second-to-last drive waveform and continuous to a last drive waveform among the plurality of drive waveforms and along which a potential of the drive signal is kept at a reference level, each of the plurality of drive waveforms includes an expansion waveform along which the potential of the drive signal changes from the reference level such that capacity of the pressure compartment expands, and a contraction waveform along which the potential of the drive signal changes so as to eject a liquid droplet from the nozzle by causing the capacity of the pressure compartment expanded by the expansion waveform to contract, pressure changes caused by the contraction waveform of the last drive waveform in the liquid present inside the pressure compartment are larger than pressure changes caused by the contraction waveform of the second-to-last drive waveform in the liquid present inside the pressure compartment, and a period of the first connection waveform is 0.8 or more times as long as a natural vibration cycle of the ejecting portion.

BRIEF DESCRIPTION OF THE DRAWINGS

FIG. 7 is a diagram for explaining the results of an ink-ejection experiment conducted while changing an interval between a preceding waveform and a succeeding waveform.

DESCRIPTION OF EXEMPLARY EMBODIMENTS

Figure 1:
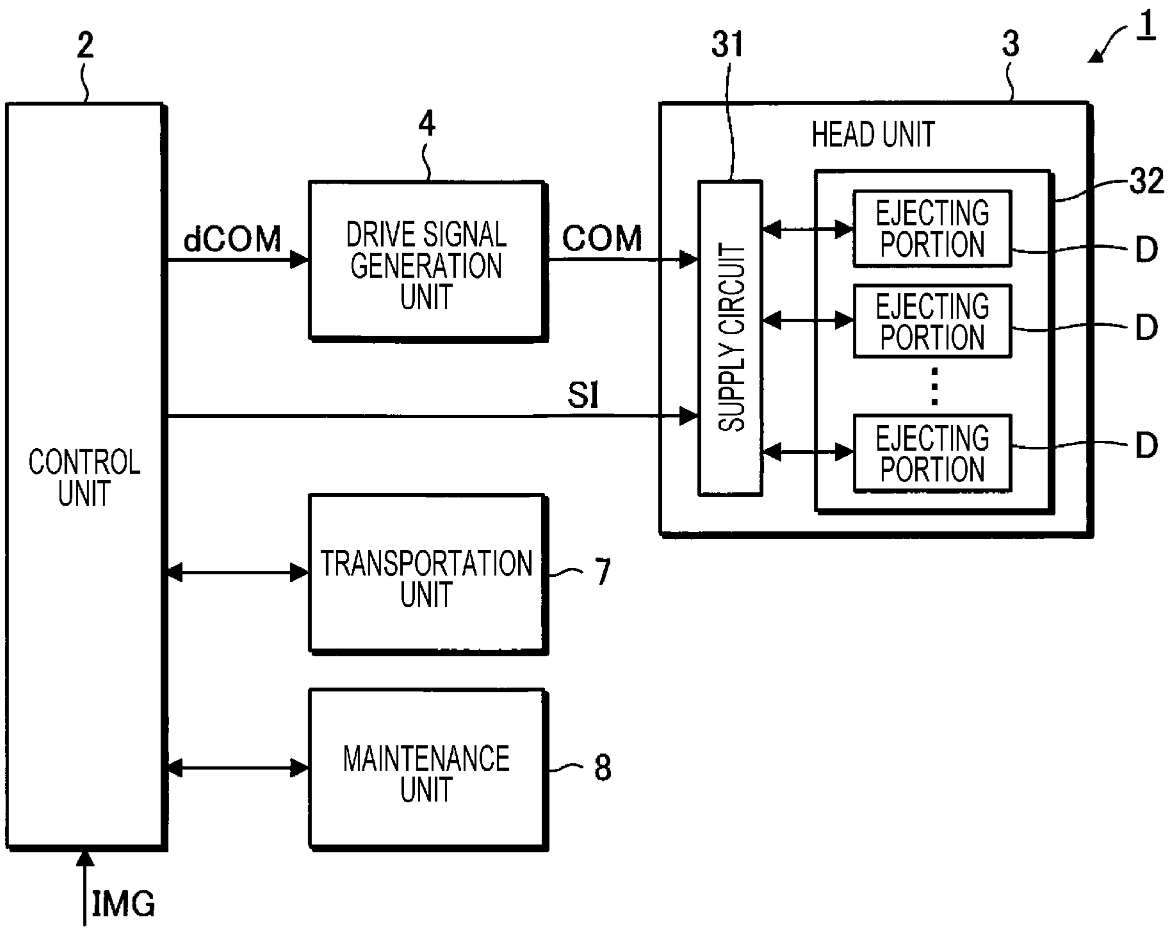
FIG. 1 is a block diagram illustrating an example of a configuration of an ink-jet printer according to a first embodiment of the present disclosure.

With reference to the accompanying drawings, some exemplary embodiments of the present disclosure will now be explained. In the drawings, the dimensions and scales of components may be made different from those in actual implementation. Since the embodiments described below show some preferred examples of the present disclosure, they contain various technically-preferred limitations. However, the scope of the present disclosure shall not be construed to be limited to the examples described below unless and except where the description contains an explicit mention of an intent to limit the present disclosure.

1. Exemplary Embodiments

In the present embodiment, a liquid ejecting apparatus will be described while taking, as an example, an ink-jet printer that forms an image by ejecting ink onto recording paper. In the present embodiment, ink is an example of a "liquid", and recording paper is an example of a "medium".

First Embodiment

FIG. 1 is a block diagram illustrating an example of a configuration of an ink-jet printer 1 according to an exemplary embodiment of the present disclosure.

Figure 2:
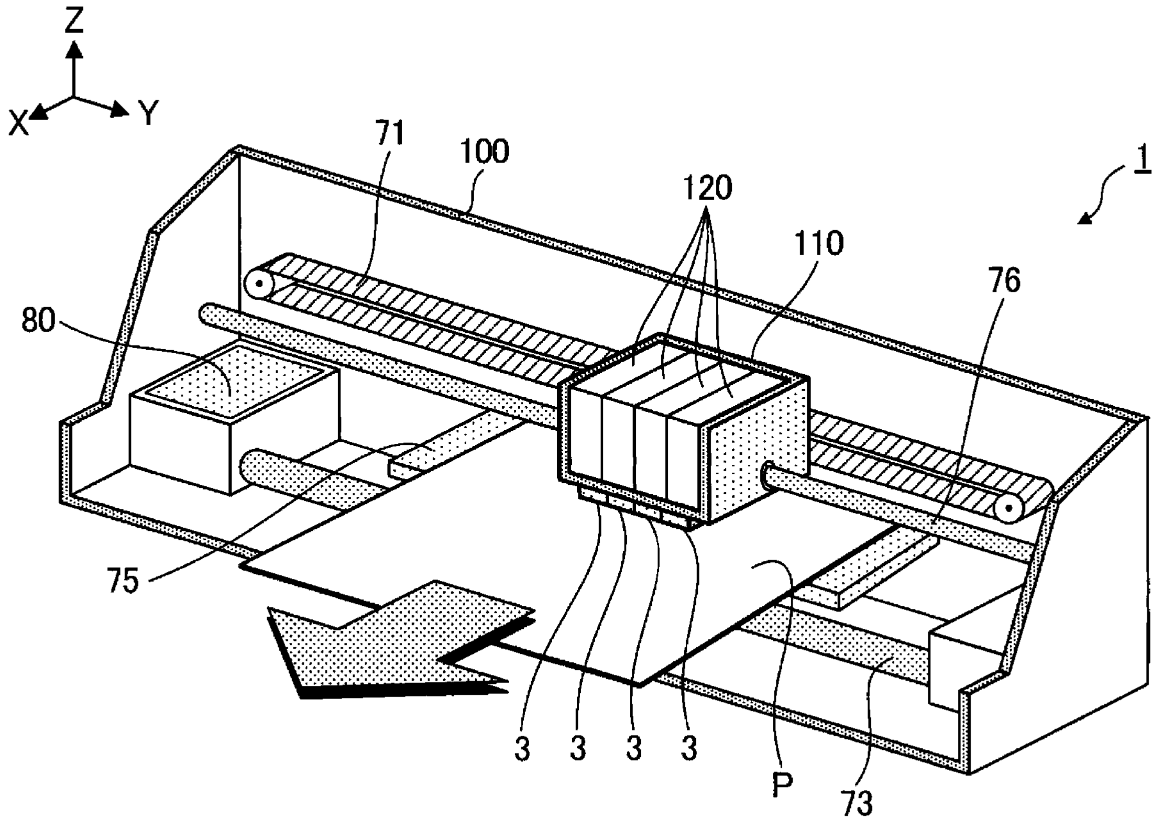
FIG. 2 is a perspective view illustrating an example of a schematic internal structure of the ink-jet printer.

Print data IMG, which represents an image to be formed by the ink-jet printer 1, is supplied to the ink-jet printer 1 from a host computer such as, for example, a personal computer or a digital camera. The ink-jet printer 1 performs print processing of forming, on a medium, an image depicted by the print data IMG supplied from the host computer. In the present embodiment, recording paper P to be mentioned later with reference to FIG. 2 is assumed as the medium.

The ink-jet printer 1 includes a control unit 2, which controls each component of the ink-jet printer 1, a head unit(s) 3, in which an ejecting portion(s) D configured to eject ink is provided, and a drive signal generation unit(s) 4, which generates a drive signal COM for driving the ejecting portion(s) D. The ink-jet printer 1 further includes a transportation unit 7, which changes the relative position of the recording paper P in relation to the head unit 3, and a maintenance unit 8, which performs maintenance processing for maintenance of the ejecting portion(s) D provided in the head unit 3.

In the present embodiment, it is assumed that the head unit(s) 3 and the drive signal generation unit(s) 4 correspond to each other. For example, the ink-jet printer 1 may include a plurality of head units 3 and a plurality of drive signal generation units 4 corresponding to the plurality of head units 3 on a one-to-one correspondence basis. Alternatively, the ink-jet printer 1 may include a single head unit 3 and a single drive signal generation unit 4 corresponding to the single head unit 3. In the present embodiment, it is assumed that the ink-jet printer 1 includes four head units 3 and four drive signal generation units 4 corresponding to the four head units 3 on a one-to-one correspondence basis. However, for a simpler explanation, as illustrated as an example in FIG. 1, a description will be given below while, where appropriate, focusing on one head unit 3 among the four head units 3 and on one signal generation unit 4 among the four drive signal generation units 4.

The control unit 2 includes one or more central processing units (CPU). The control unit 2 may include a programmable logic device such as a field-programmable gate array (FPGA) in addition to, or in place of, the CPU. The control unit 2 further includes either one or both of a volatile memory such as a random access memory (RAM) and a nonvolatile memory such as a read-only memory (ROM), an electrically erasable programmable read-only memory (EEPROM), or programmable ROM (PROM).

As will be described in detail later, the control unit 2 generates signals for controlling the operation of the components of the ink-jet printer 1, for example, a print signal SI, a waveform specifying signal dCOM, and the like. The waveform specifying signal dCom is a digital signal for specifying the waveform of the drive signal Com. The drive signal Com is an analog signal for driving the ejecting portion D. The print signal SI is a digital signal for specifying the type of operation of the ejecting portion D. Specifically, the print signal SI is a signal for specifying the type of operation of the ejecting portion D by specifying whether or not to supply the drive signal COM to the ejecting portion D.

The drive signal generation unit 4 includes, for example, a digital analog converter (DAC), and generates the drive signal COM, based on the waveform specifying signal dCOM supplied from the control unit 2. For example, the drive signal generation unit 4 generates the drive signal COM having a waveform specified by the waveform specifying signal dCOM. The drive signal generation unit 4 outputs the drive signal COM generated based on the waveform specifying signal dCOM to a supply circuit 31 included in the head unit 3. The drive signal generation unit 4 is an example of a "signal generation unit". Moreover, for example, among functional blocks realized by the control unit 2, a functional block that generates a waveform specifying signal dCom may be included in the "signal generation unit".

The head unit 3 includes the supply circuit 31 and a recording head 32.

The recording head 32 includes an M number of the ejecting portion(s) D. The value of M is a natural number that is not less than 1. In the description below, among the M number of the ejecting portions D provided in the recording head 32, the m-th (meaning "ordinal number m") ejecting portion D may be denoted as the ejecting portion D[m], where appropriate. In this definition, the variable number m is a natural number that satisfies "$1 \le m \le M$". Moreover, in the description below, when a certain component, a certain signal, etc. of the ink-jet printer 1 corresponds to the ejecting portion D[m] among the M number of the ejecting portions D, a suffix [m] may be appended to the reference sign of this component, this signal, etc., where appropriate.

Figure 5:
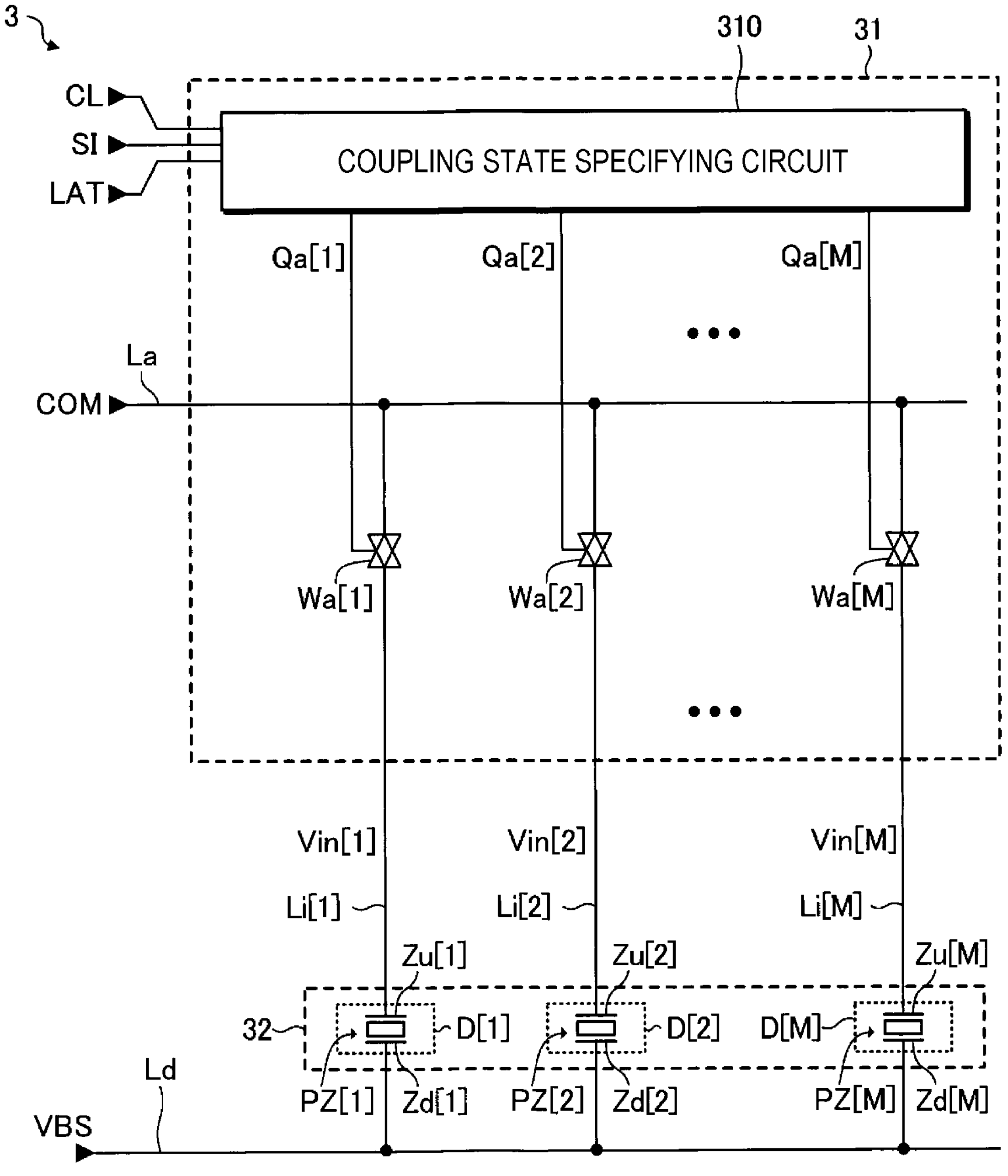
FIG. 5 is a block diagram illustrating an example of a configuration of the head unit.

Based on the print signal SI, the supply circuit 31 switches whether or not to supply the drive signal COM to the ejecting portion D[m]. In the description below, as illustrated in FIG. 5, etc., which will be described later, the drive signal COM supplied to the ejecting portion D[m] may be referred to as an individual drive signal Vin[m], where appropriate.

As described above, in the present embodiment, the ink-jet printer 1 performs print processing. When print processing is performed, based on the print data IMG, the control unit 2 generates signals such as the print signal SI for controlling the head unit 3. In addition, when print processing is performed, the control unit 2 generates signals such as the waveform specifying signal dCOM for controlling the drive signal generation unit 4. Moreover, when print processing is performed, the control unit 2 generates a signal for controlling the transportation unit 7. By means of these signals, in print processing, the control unit 2 controls whether or not to eject ink from the ejecting portion D[m] and adjusts an amount of ink that is ejected and a timing of ink ejection, and the like while controlling the transportation unit 7 so as to change the relative position of the recording paper P in relation to the head unit 3. In this way, the control unit 2 controls the components of the ink-jet printer 1 so that an image corresponding to the print data IMG will be formed on the recording paper P.

As described above, in the present embodiment, the ink-jet printer 1 performs maintenance processing. For example, the maintenance processing includes flushing processing of forcibly discharging ink out of the ejecting portion D, wiping processing of wiping off a foreign substance such as ink that is on the neighborhood of the nozzle N of the ejecting portion D by using a wiper, and pumping processing of sucking ink present inside the ejecting portion D by using a tube pump and the like. The nozzle N will be described later with reference to FIG. 3.

The maintenance unit 8 includes a discharged ink receiver 80 configured to receive discharged ink when the ink is forcibly discharged out of the ejecting portion D in flushing processing, a wiper configured to wipe off a foreign substance such as ink that is on the neighborhood of the nozzle N of the ejecting portion D, and a tube pump configured to suck ink and air bubbles and the like that are present inside the ejecting portion D. The discharged ink receiver 80 is illustrated in FIG. 2 described below. The wiper and the tube pump are not illustrated. Next, with reference to FIG. 2, a schematic internal structure of the ink-jet printer 1 will now be described.

FIG. 2 is a perspective view illustrating an example of a schematic internal structure of the ink-jet printer 1.

As illustrated in FIG. 2, in the present embodiment, a case where the ink-jet printer 1 is a serial printer is assumed. Specifically, when print processing is performed, the ink-jet printer 1 forms dots corresponding to the print data IMG on the recording paper P by ejecting ink from the ejecting portion D[m] while reciprocating the head unit 3 in a main-scan direction intersecting with a sub-scan direction and while transporting the recording paper P in the sub-scan direction.

In the description below, three axes including an X axis, a Y axis, and a Z axis, which are orthogonal to one another, are introduced in order to facilitate an explanation. In the description below, the direction pointed by an arrow of the X axis will be referred to as a +X direction, and the direction that is the opposite of the +X direction will be referred to as a −X direction. The direction pointed by an arrow of the Y axis will be referred to as a +Y direction, and the direction that is the opposite of the +Y direction will be referred to as a −Y direction. The direction pointed by an arrow of the Z axis will be referred to as a +Z direction, and the direction that is the opposite of the +Z direction will be referred to as a −Z direction. In the description below, the +X direction and the −X direction may be referred to as the X direction without making a distinction therebetween, where appropriate. The +Y direction and the −Y direction may be referred to as the Y direction without making a distinction therebetween, where appropriate. The +Z direction and the −Z direction may be referred to as the Z direction without making a distinction therebetween, where appropriate. In the present embodiment, the +X direction is defined as the sub-scan direction, and the +Y direction and the −Y direction are defined as the main-scan direction. In addition, in the present embodiment, as illustrated in FIG. 2, the −Z direction is defined as the direction in which ink is ejected from the ejecting portion D[m].

The ink-jet printer 1 according to the present embodiment includes a cabinet 100 and a carriage 110. The carriage 110 is capable of reciprocating inside the cabinet 100. Four head units 3 are mounted on the carriage 110.

In the present embodiment, it is assumed that four ink cartridges 120 corresponding to ink of four color components, specifically, cyan, magenta, yellow, and black, on a one-to-one correspondence basis are encased in the carriage 110. In the present embodiment, as described earlier, it is assumed that the ink-jet printer 1 includes four head units 3 corresponding to the four ink cartridges 120 on a one-to-one correspondence basis. Each ejecting portion D[m] receives ink supply from the ink cartridge 120 corresponding to the head unit 3 in which this ejecting portion D[m] is provided. Therefore, each ejecting portion D[m] is capable of being filled with the supplied ink and ejecting it through the nozzle N. The ink cartridges 120 may be provided outside the carriage 110.

As described earlier with reference to FIG. 1, the ink-jet printer 1 according to the present embodiment includes the transportation unit 7. The transportation unit 7 includes a carriage transportation mechanism 71, which causes the carriage 110 to reciprocate in the Y direction, and a carriage guide shaft 76, which supports the carriage 110 such that it can reciprocate in the Y direction. The transportation unit 7 further includes a medium transportation mechanism 73, which transports the recording paper P, and a platen 75, which is provided on the −Z-directional side with respect to the carriage 110. For example, in print processing, the carriage transportation mechanism 71 causes the head units 3 together with the carriage 110 to reciprocate in the Y direction along the carriage guide shaft 76, and the medium transportation mechanism 73 transports the recording paper P on the platen 75 in the +X direction. Therefore, in print processing, the transportation unit 7 changes the relative position of the recording paper P in relation to the head units 3 by causing the carriage transportation mechanism 71 and the medium transportation mechanism 73 to perform the operation described above, thereby enabling ejection of ink onto the entire area of the recording paper P. In the present embodiment, it is assumed that a plurality of ink droplets merging together before landing onto a surface of the recording paper P is ejected from the nozzle N. The ink droplet is a micro drop of ink. The ink droplet is an example of a “liquid droplet”. The plurality of ink droplets is an example of a “plurality of liquid droplets”.

Next, with reference to FIG. 3, a schematic structure of the recording head 32 will now be described.

Figure 3:
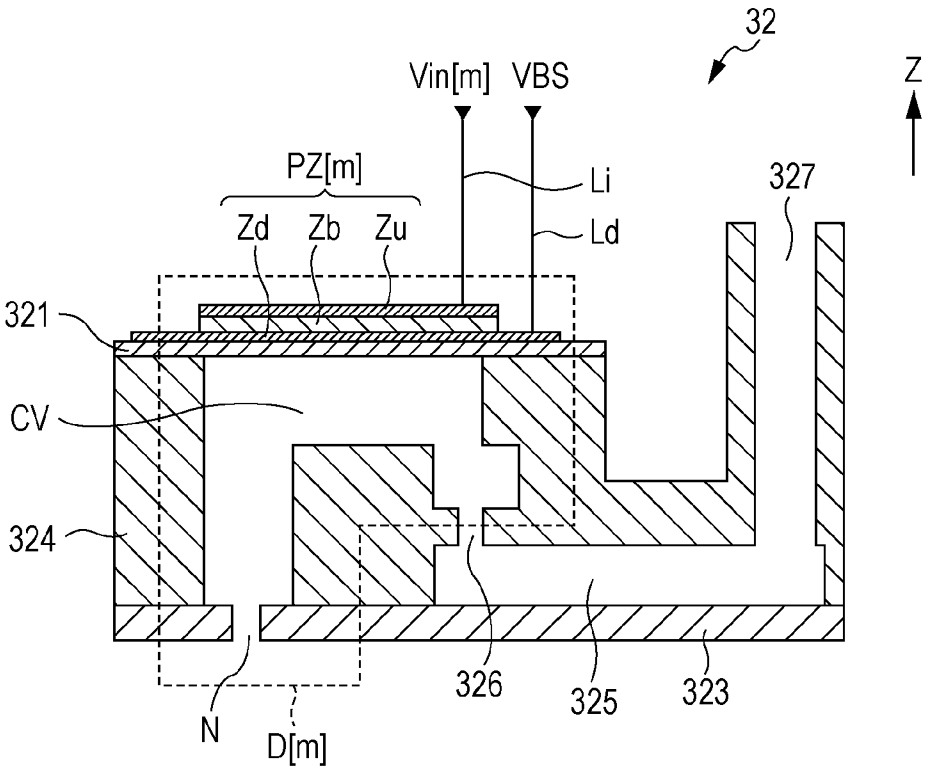
FIG. 3 is a cross-sectional view for explaining an example of a structure of an ejecting portion.

FIG. 3 is a cross-sectional view for explaining an example of a structure of the ejecting portion D. In FIG. 3, a cross section of a part of the recording head 32 is schematically illustrated under an assumption that the recording head 32 is cut along a plane including the ejecting portion D[m].

The ejecting portion D[m] includes a piezoelectric element PZ[m], a cavity CV, the inside of which is to be filled with ink, the nozzle N, which is in communication with the cavity CV, and a diaphragm 321. The ejecting portion D[m] ejects ink present inside the cavity CV through the nozzle N when the piezoelectric element PZ[m] is driven by means of the individual drive signal Vin[m]. The cavity CV is an example of a “pressure compartment”. The piezoelectric element PZ[m] is an example of a “drive element”.

The cavity CV is a space demarcated by a cavity plate 324, a nozzle plate 323, which has the nozzle N formed through itself, and the diaphragm 321. The cavity CV is in communication with a reservoir 325 through an ink supply port 326. The reservoir 325 is in communication with the ink cartridge 120 corresponding to the ejecting portion D[m] through an ink inlet port 327. The piezoelectric element PZ[m] includes an upper electrode Zu[m], a lower electrode Zd[m], and a piezoelectric substance Zb[m], which is provided between the upper electrode Zu[m] and the lower electrode Zd[m]. The upper electrode Zu[m] is electrically coupled to a wiring line Li, to which the individual drive signal Vin[m] is supplied. The lower electrode Zd[m] is electrically coupled to a wiring line Ld, to which a bias voltage signal VBS is supplied. A voltage is applied between the upper electrode Zu[m] and the lower electrode Zd[m] when the individual drive signal Vin[m] is supplied to the upper electrode Zu[m]. The piezoelectric element PZ[m] becomes displaced in the +Z direction or the −Z direction in accordance with the voltage applied between the upper electrode Zu[m] and the lower electrode Zd[m].

As described above, the piezoelectric element PZ[m] vibrates in accordance with the voltage applied between the upper electrode Zu[m] and the lower electrode Zd[m]. The lower electrode Zd[m] is bonded to the diaphragm 321. Therefore, when the piezoelectric element PZ[m] driven by means of the individual drive signal Vin[m] vibrates, the diaphragm 321 also vibrates. The vibration of the diaphragm 321 causes a change in the capacity of the cavity CV and a change in the internal pressure of the cavity CV. As a result, the ink, with which the inside of the cavity CV is filled, is ejected through the nozzle N.

In the present embodiment, for the purpose of giving an example, it is assumed that the piezoelectric element PZ becomes displaced in the −Z direction due to a change in the potential of the individual drive signal Vin[m] supplied to the ejecting portion D[m] from a low level to a high level. That is, in the present embodiment, it is assumed that the capacity of the cavity CV of the ejecting portion D[m] is smaller when the potential of the individual drive signal Vin[m] supplied to the ejecting portion D[m] is in a high level than when in a low level.

Next, with reference to FIG. 4, a layout example of the nozzles N will now be described.

Figure 4:
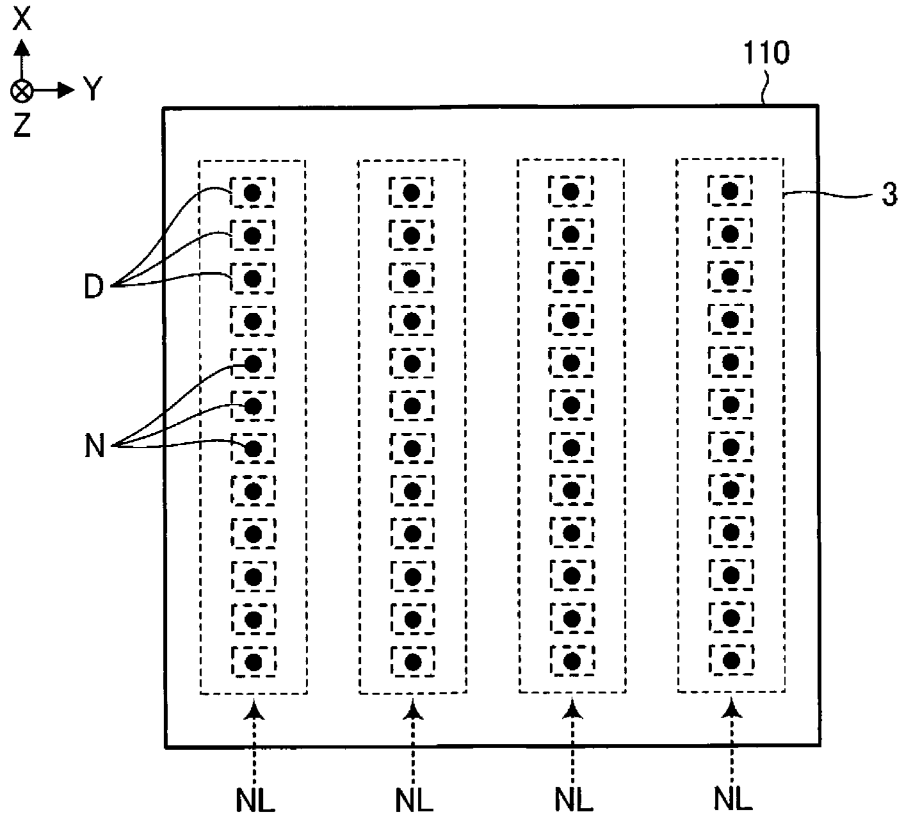
FIG. 4 is a plan view illustrating a layout example of nozzles of head units.

FIG. 4 is a plan view illustrating a layout example of the nozzles N of the head units 3. In FIG. 4, together with four head units 3 mounted on the carriage 110, a layout example of the nozzles N (the number of which is 4M in total) provided on these four head units 3 in a plan view of the ink-jet printer 1 from the −Z directional side is illustrated.

A nozzle row NL is provided on each of the head units 3 provided on the carriage 110. The nozzle row NL is a plurality of nozzles N arranged in a line extending in a predetermined direction. In the present embodiment, a case where each of the nozzle rows NL is made up of an M number of nozzles N arranged in the X direction is assumed as an example.

Next, with reference to FIGS. 5 and 6, an overview of the head unit 3 will be given below.

FIG. 5 is a block diagram illustrating an example of a configuration of the head unit 3.

As described earlier with reference to FIG. 1, the head unit 3 includes the supply circuit 31 and the recording head 32. The recording head 32 includes a wiring line La, via which the drive signal COM is supplied from the drive signal generation unit 4, and a wiring line Li[m], via which the individual drive signal Vin[m] is supplied to the ejecting portion D[m].

The supply circuit 31 includes an M number of switches Wa[1] to Wa[M] corresponding to the M number of the ejecting portions D[1] to D[M] on a one-to-one correspondence basis. The supply circuit 31 further includes a coupling state specifying circuit 310. The coupling state specifying circuit 310 specifies a coupling state of each of the M number of switches Wa. For example, based on at least a part of signals including the print signal SI and a latch signal LAT supplied from the control unit 2, the coupling state specifying circuit 310 generates a coupling state specifying signal Qa[m] for specifying ON/OFF of the switch Wa[m].

Based on the coupling state specifying signal Qa[m], the switch Wa[m] switches a conduction between the wiring line La and the upper electrode Zu[m] of the piezoelectric element PZ[m] provided in the ejecting portion D[m] between a conductive state and a non-conductive state. That is, based on the coupling state specifying signal Qa[m], the switch Wa[m] switches the conduction between the wiring line La and the wiring line Li[m] leading to the upper electrode Zu[m] between a conductive state and a non-conductive state. In the present embodiment, the switch Wa[m] is ON when the coupling state specifying signal Qa[m] is in a high level, and the switch Wa[m] is OFF when the coupling state specifying signal Qa[m] is in a low level. When the switch Wa[m] is ON, the drive signal COM supplied to the wiring line La is supplied to the upper electrode Zu[m] of the ejecting portion D[m] through the wiring line Li[m] as the individual drive signal Vin[m].

Next, with reference to FIG. 6, operation of the head unit 3 will now be described.

In the present embodiment, when the ink-jet printer 1 performs print processing or flushing processing, a single unit period TP, or a plurality of unit periods TP, is set as an operation period of the ink-jet printer 1. The ink-jet printer 1 according to the present embodiment is capable of driving each ejecting portion D[m] in each unit period TP for the purpose of print processing or flushing processing.

Figure 6:
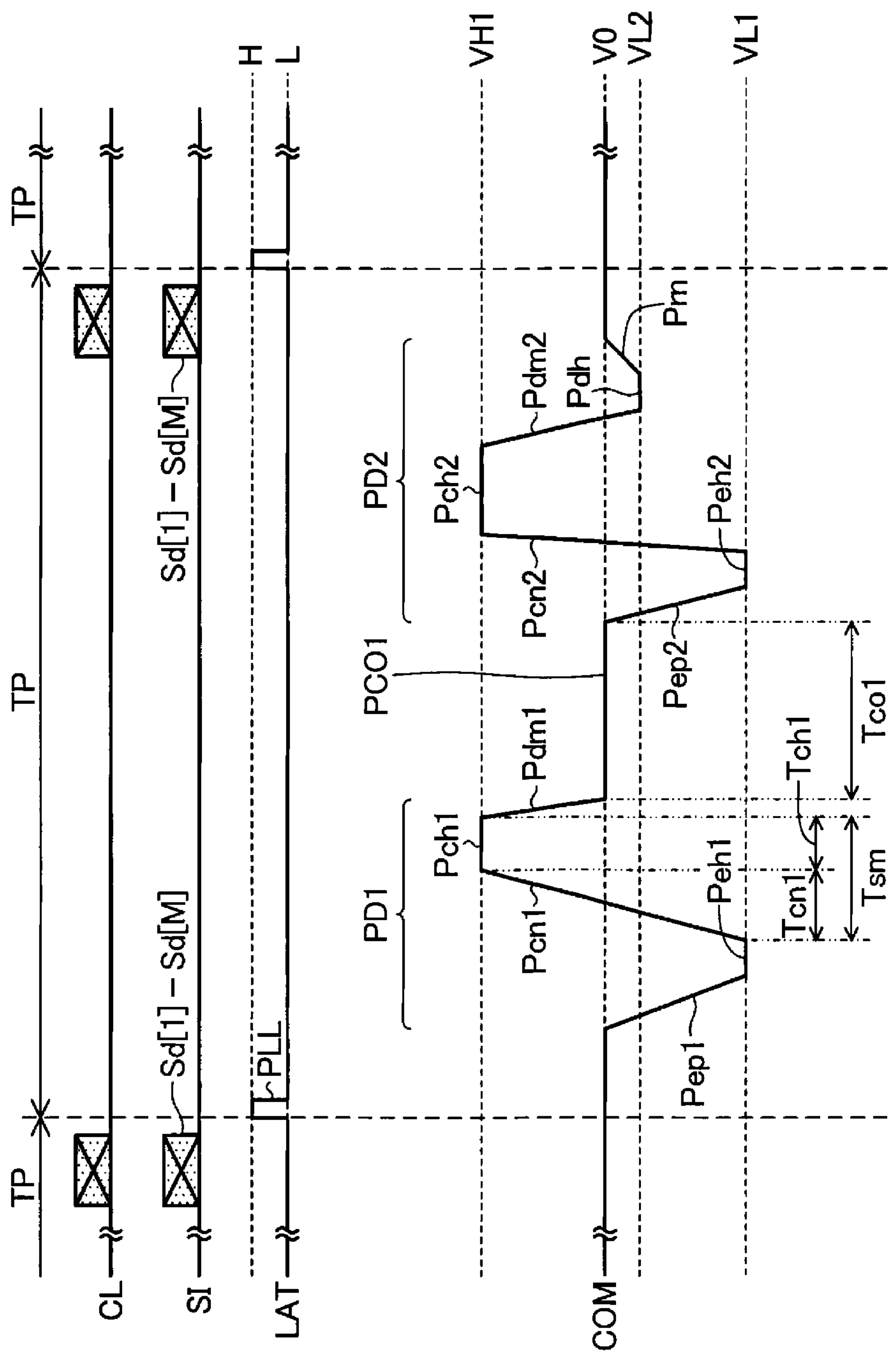
FIG. 6 is a timing chart for explaining an example of signals supplied to the head unit.

FIG. 6 is a timing chart for explaining an example of signals supplied to the head unit 3.

The control unit 2 outputs a latch signal LAT having pulses PLL. By means of this pulsed signal, the control unit 2 defines the unit period TP as a period from the rising of a certain pulse PLL to the rising of the next pulse PLL. The unit period TP is a period for, for example, forming one dot corresponding to each nozzle N on the recording paper P. In the present embodiment, it is assumed that two ink droplets are ejected from the nozzle N within the same unit period TP, and these two ink droplets merge together before landing onto a surface of the recording paper P, thereby forming a single dot on the recording paper P.

The print signal SI according to the present embodiment includes an M number of individual specifying signals Sd[1] to Sd[M] corresponding to the M number of the ejecting portions D[1] to D[M] on a one-to-one correspondence basis. The individual specifying signals Sd[m] specifies the behavior of the ejecting portion D[m] in each unit period TP when the ink-jet printer 1 performs print processing or flushing processing. For example, prior to each unit period TP, the control unit 2 supplies the print signal SI including the M number of individual specifying signals Sd[1] to Sd[M] to the coupling state specifying circuit 310 in synchronization with a clock signal CL. Then, based on the individual specifying signals Sd[m], in the unit period TP, the coupling state specifying circuit 310 generates the coupling state specifying signal Qa[m].

For example, by means of the individual specifying signals Sd[m], the ejecting portion D[m] is designated as either the ejecting portion D that forms a dot or the ejecting portion D that does not form a dot in the unit period TP1 in which print processing is performed.

The drive signal COM includes waveforms PD1 and PD2, which cause pressure changes in ink present inside the cavity CV, and a waveform PCO1, which is continuous from the waveform PD1 and continuous to the waveform PD2. For example, the drive signal COM includes a pulse of the waveform PD1 and a pulse of the waveform PD2 that are provided in the unit period TP. The waveform PD1 and the waveform PD2 constitute an example of a "plurality of drive waveforms". Therefore, the waveform PD1 is an example of a "second-to-last drive waveform", and the waveform PD2 is an example of a "last drive waveform". The waveform PCO1 is an example of a "first connection waveform". In the description below, the waveform PD1 and the waveform PD2 will be referred to also as a waveform PD without making a distinction therebetween.

As will be described in detail later, the waveform PD1 and the waveform PD2 are waveforms for ejecting ink droplets from the nozzle N. For example, an ink droplet ejected from the nozzle N due to being driven by the waveform PD1 and an ink droplet ejected from the nozzle N due to being driven by the waveform PD2 within the same unit period TP merge together before landing onto a surface of the recording paper P. First, the waveform PD1 will now be explained.

The waveform PD1 is a waveform specifying that the potential of the drive signal COM changes from a reference level V0 to a level VL1, next to a level VH1, and then returns to the reference level V0. The level VH1 is a level higher than the reference level V0. The level VL1 is a level lower than the reference level V0. Each of the reference level V0, the level VH1, and the level VL1 is determined based on, for example, the characteristics of ink ejection by the ejecting portion D. Examples of the ink-ejection characteristics are: an amount of ink ejected as an ink droplet, a speed of the ejected ink droplet, and the like.

In the description below, of the waveform PD1, a portion where the potential of the drive signal COM changes from the reference level V0 to the level VL1 will be referred to also as a waveform Pep1, and a portion where the potential of the drive signal COM is kept at the level VL1 will be referred to also as a waveform Peh1. Of the waveform PD1, a portion where the potential of the drive signal COM changes from the level VL1 to the level VH1 will be referred to also as a waveform Pcn1, and a portion where the potential of the drive signal COM is kept at the level VH1 will be referred to also as a waveform Pch1. Of the waveform PD1, a portion where the potential of the drive signal COM changes from the level VH1 to the reference level V0 will be referred to also as a waveform Pdm1. That is, the waveform PD1 includes the waveforms Pep1, Peh1, Pcn1, Pch1, and Pdm1.

The waveform Pep1 is a waveform for causing a displacement of the piezoelectric element PZ in the +Z direction. That is, the waveform Pep1 is a waveform along which the potential of the drive signal COM changes so as to cause the capacity of the cavity CV to expand. Therefore, among a plurality of elements making up the pulse of the waveform PD1, the waveform Pep1 corresponds to an expansion element for changing the potential of the drive signal COM in order to drive the piezoelectric element PZ such that the capacity of the cavity CV will expand. The waveform Pep1 is an example of an "expansion waveform".

The waveform Peh1 is a waveform for keeping the position of the piezoelectric element PZ in the Z direction. For example, among the plurality of elements making up the pulse of the waveform PD1, the waveform Peh1 corresponds to an expansion maintaining element for maintaining the potential of the drive signal COM in order to drive the piezoelectric element PZ such that the capacity of the cavity CV having been expanded by the waveform Pep1 will be maintained. In the example illustrated in FIG. 6, the waveform Peh1 is a waveform along which the potential of the drive signal COM is kept at the level VL1, which is a level at the time of end of the waveform Pep1.

The waveform Pcn1 is a waveform for causing a displacement of the piezoelectric element PZ in the −Z direction. That is, the waveform Pcn1 is a waveform along which the potential of the drive signal COM changes so as to cause the capacity of the cavity CV to contract. Therefore, among the plurality of elements making up the pulse of the waveform PD1, the waveform Pcn1 corresponds to a contraction element for changing the potential of the drive signal COM in order to drive the piezoelectric element PZ such that the capacity of the cavity CV will contract. The waveform Pcn1 is an example of a "contraction waveform".

In the present embodiment, as described earlier with reference to FIG. 3, it is assumed that the capacity of the cavity CV of the ejecting portion D[m] is smaller when the potential of the individual drive signal Vin[m] is in a high level than when in a low level. Therefore, when the drive signal COM is supplied as the individual drive signal Vin[m] to the ejecting portion D[m], some part of ink present inside the ejecting portion D[m] is ejected as the first one of ink droplets from the nozzle N due to being driven by the waveform Pcn1, along which the potential of the individual drive signal Vin[m] changes from a low level to a high level. That is, the waveform Pcn1 is a waveform along which the potential of the drive signal COM changes so as to eject an ink droplet from the nozzle N by causing the capacity of the cavity CV having been expanded by the waveform Pep1 to contract.

The waveform Pch1 is a waveform for keeping the position of the piezoelectric element PZ in the Z direction. For example, among the plurality of elements making up the pulse of the waveform PD1, the waveform Pch1 corresponds to a contraction maintaining element for maintaining the potential of the drive signal COM in order to drive the piezoelectric element PZ such that the capacity of the cavity CV having been contracted by the waveform Pcn1 will be maintained. In the example illustrated in FIG. 6, the waveform Pch1 is a waveform along which the potential of the drive signal COM is kept at the level VH1, which is a level at the time of end of the waveform Pcn1. The waveform Pch1 is an example of a "first contraction maintaining waveform".

The waveform Pdm1 is a waveform for causing a displacement of the piezoelectric element PZ in the +Z direction. For example, the waveform Pdm1 is a waveform along which the potential of the drive signal COM changes so as to attenuate residual vibration of ink inside the cavity CV by causing the capacity of the cavity CV having been contracted by the waveform Pcn1 to expand. That is, the waveform Pdm1 is a waveform along which the potential of the drive signal COM changes from the level VH1 to the reference level V0 so as to attenuate residual vibration of ink inside the cavity CV by causing the capacity of the cavity CV having been maintained by the waveform Pch1 to expand. Therefore, among the plurality of elements making up the pulse of the waveform PD1, the waveform Pdm1 corresponds to a vibration damping element for changing the potential of the drive signal COM in order to drive the piezoelectric element PZ such that residual vibration of ink inside the cavity CV will be attenuated by expansion of the capacity of the cavity CV. The waveform Pdm1 is an example of a "first vibration damping waveform".

For example, at a timing that corresponds to the length of the waveform Pch1, vibration of ink inside the cavity CV that has occurred before the end of the waveform Pcn1 is combined with vibration that is generated by the waveform Pdm1. That is, the piezoelectric element PZ[m] attenuates the vibration of ink inside the cavity CV by causing the capacity of the cavity CV to expand in accordance with a potential change caused by the waveform Pdm1.

In the present embodiment, it is assumed that, in the waveform PD1, a period Tsm, which is equal to a sum of a period Tcn1 of the waveform Pcn1 and a period Tch1 of the waveform Pch1, is the same in length as a natural vibration cycle of the ejecting portion D. The term "same" mentioned here encompasses not only the meaning of exact equality but also the meaning of substantial equality (for example, the same with an allowable margin of error). The natural vibration cycle of the ejecting portion D is, for example, a natural vibration cycle that is representative of natural vibration cycles of the M number of the ejecting portions D. For example, the natural vibration cycle that is representative of the natural vibration cycles of the M number of the ejecting portions D may be the natural vibration cycle of one ejecting portion D among the M number of the ejecting portions D. Alternatively, the natural vibration cycle that is representative of the natural vibration cycles of the M number of the ejecting portions D may be an average of natural vibration cycles of an N number of the ejecting portions D, or a maximum value or a minimum value among the natural vibration cycles of the N number of the ejecting portions D. The value N is a natural number that satisfies "$2 \le N \le M$".

In the present embodiment, since the natural vibration cycle of the ejecting portion D and the period Tsm have the same length, the interval from the timing of start of the waveform Pcn1, which corresponds to a contraction waveform, to the timing of start of the waveform Pdm1, which corresponds to a vibration damping element, is the same in length as the natural vibration cycle of the ejecting portion D. Therefore, in the present embodiment, it is possible to attenuate the vibration of ink inside the cavity CV efficiently by means of the waveform Pdm1.

Moreover, in the present embodiment, since the interval between the waveform PD1 and the waveform PD2 is guaranteed by the waveform PCO1, it is possible to attenuate residual vibration caused by the waveform PD1 sufficiently before the waveform PD2 starts. Therefore, in the present embodiment, it is possible to reduce an influence of residual vibration caused by the waveform PD1 on ink-droplet ejection performed by means of the next waveform PD2, thereby suppressing instability in ink-droplet ejection performed by means of the waveform PD2. Examples of instability in ink-droplet ejection are: a deviation in the direction of ejection of an ink droplet from a predetermined direction, non-ejection of an ink droplet from the nozzle N, and the like.

The waveform PCO1 is a waveform along which the potential of the drive signal COM is kept at a level at the time of end of the waveform PD1 and at a level at the time of start of the waveform PD2. The level at the time of end of the waveform PD1 and the level at the time of start of the waveform PD2 are the reference level V0, at which the waveform Pdm1 ends and at which a waveform Pep2 starts. That is, the waveform PCO1 is a waveform along which the potential of the drive signal COM is kept at the reference level V0. Since the potential of the drive signal COM at the time of end of the waveform Pdm1 is the reference level V0, the capacity of the cavity CV returns at the time of end of the waveform PD1 to a default capacity of the cavity CV, which is capacity in a default state before supply of the waveform PD1 to the piezoelectric element PZ. Therefore, the capacity of the cavity CV is kept at the default capacity of the cavity CV by the waveform PCO1. A period Tco1 of the waveform PCO1 is, for example, 0.8 or more times as long as the natural vibration cycle of the ejecting portion D.

Next, the waveform PD2 will now be explained. A detailed explanation of the same elements as those of the waveform PD1 will not be given below.

The waveform PD2 is a waveform specifying that the potential of the drive signal COM changes from the reference level V0 to the level VL1, next to the level VH1, next to a level VL2, and then returns to the reference level V0. The level VL2 is determined such that, for example, residual vibration caused by the waveform PD2 of the current unit period TP will be attenuated sufficiently before the waveform PD1 of the next unit period TP starts.

In the description below, of the waveform PD2, a portion where the potential of the drive signal COM changes from the reference level V0 to the level VL1 will be referred to also as the waveform Pep2, and a portion where the potential of the drive signal COM is kept at the level VL1 will be referred to also as a waveform Peh2. Of the waveform PD2, a portion where the potential of the drive signal COM changes from the level VL1 to the level VH1 will be referred to also as a waveform Pcn2, and a portion where the potential of the drive signal COM is kept at the level VH1 will be referred to also as a waveform Pch2. Of the waveform PD2, a portion where the potential of the drive signal COM changes from the level VH1 to the level VL2 will be referred to also as a waveform Pdm2, and a portion where the potential of the drive signal COM is kept at the level VL2 will be referred to also as a waveform Pdh. Of the waveform PD2, a portion where the potential of the drive signal COM changes from the level VL2 to the reference level V0 will be referred to also as a waveform Prn. That is, the waveform PD2 includes the waveforms Pep2, Peh2, Pcn2, Pch2, Pdm2, Pdh, and Prn.

The waveform PD2 is similar to the waveform PD1 but includes the waveforms Pdh and Prn. For example, the waveform Pep2 is a waveform that causes the capacity of the cavity CV to expand, similarly to the waveform Pep1, and the waveform Peh2 is a waveform that maintains the expanded capacity of the cavity CV, similarly to the waveform Peh1. The waveform Pcn2 is a waveform for ejecting ink from the nozzle N by causing the expanded capacity of the cavity CV to contract, similarly to the waveform Pcn1, except that a potential change amount of the waveform Pcn2 per unit time is larger than a potential change amount of the waveform Pcn1 per unit time. The waveform Pch2 is a waveform for maintaining the contracted capacity of the cavity CV, similarly to the waveform Pch1. The waveform Pdm2 is a waveform for attenuating residual vibration of ink inside the cavity CV by causing the contracted capacity of the cavity CV to expand, similarly to the waveform Pdm1, except that a potential level at the time of its end is different. The waveform Pep2 is an example of an "expansion waveform". The waveform Pcn2 is an example of a "contraction waveform". The waveform Pch2 is an example of a "second contraction maintaining waveform". The waveform Pdm2 is an example of a "second vibration damping waveform".

The description below will be given while focusing on the waveforms Pcn2, Pdm2, Pdh, and Prn, which are major points of difference of the waveform PD2 from the waveform PD1. In the description below, the waveform Pcn1 and the waveform Pcn2 will be referred to also as a waveform Pcn without making a distinction therebetween. Similarly, the waveform Pdm1 and the waveform Pdm2 will be referred to also as a waveform Pdm. The waveform Pep1 and the waveform Pep2 will be referred to also as a waveform Pep, the waveform Peh1 and the waveform Peh2 will be referred to also as a waveform Peh, and the waveform Pch1 and the waveform Pch2 will be referred to also as a waveform Pch.

The waveform Pcn2 is a waveform along which the potential of the drive signal COM changes so as to eject an ink droplet from the nozzle N by causing the capacity of the cavity CV having been expanded by the waveform Pep2 to contract. For example, when the drive signal COM is supplied as the individual drive signal Vin[m] to the ejecting portion D[m], some part of ink present inside the ejecting portion D[m] is ejected as the second one of ink droplets from the nozzle N due to being driven by the waveform Pcn2, along which the potential of the individual drive signal Vin[m] changes from a low level to a high level. In the present embodiment, since the potential change amount of the waveform Pcn2 per unit time is larger than the potential change amount of the waveform Pcn1 per unit time, the speed of the second ink droplet is higher than the speed of the first ink droplet ejected due to being driven by the waveform Pcn1. Therefore, the second ink droplet ejected due to being driven by the waveform Pcn2 merges with the first ink droplet ejected due to being driven by the waveform Pcn1 before landing onto a surface of the recording paper P.

When a potential change amount of the waveform Pcn per unit time is relatively large, pressure changes caused by the waveform Pcn in ink present inside the cavity CV will be larger than when the potential change amount of the waveform Pcn per unit time is relatively small. Moreover, when pressure changes in ink present inside the cavity CV are relatively large, the speed of an ink droplet ejected from the nozzle N will be higher than when the pressure changes in ink present inside the cavity CV are relatively small.

In the present embodiment, as described above, the potential change amount of the waveform Pcn2 per unit time is larger than the potential change amount of the waveform Pcn1 per unit time; therefore, pressure changes caused by the waveform Pcn2 in ink present inside the cavity CV will be larger than pressure changes caused by the waveform Pcn1 in ink present inside the cavity CV. Therefore, in the present embodiment, it is possible to make the speed of an ink droplet ejected from the nozzle N due to being driven by the waveform Pcn2 higher than the speed of an ink droplet ejected from the nozzle N due to being driven by the waveform Pcn1.

Though it is assumed in the present embodiment that a potential change amount of the waveform Pcn1 is the same as a potential change amount of the waveform Pcn2, the potential change amount of the waveform Pcn1 may be different from the potential change amount of the waveform Pcn2. For example, when the potential change amount of the waveform Pcn2 is larger than the potential change amount of the waveform Pcn1, pressure changes caused by the waveform Pcn2 in ink present inside the cavity CV will be larger than pressure changes caused by the waveform Pcn1 in ink present inside the cavity CV. Also in this case, it is possible to make the speed of an ink droplet ejected from the nozzle N due to being driven by the waveform Pcn2 higher than the speed of an ink droplet ejected from the nozzle N due to being driven by the waveform Pcn1. However, as compared with when the waveform Pcn1 is the same as the waveform Pcn2 in terms of both its level at the time of start and its level at the time of end, it is more susceptible to the influence of variations in manufacturing of the piezoelectric element PZ, etc. when the waveform Pcn1 is different from the waveform Pcn2 in terms of either its level at the time of start or its level at the time of end, or both.

Therefore, in the present embodiment, the level at the time of start of the waveform Pcn1 and the level at the time of start of the waveform Pcn2 are set at the same level VL1, and the level at the time of end of the waveform Pcn1 and the level at the time of end of the waveform Pcn2 are set at the same level VH1. In addition, in the present embodiment, the waveforms Pcn1 and Pcn2 are set such that the potential change amount of the waveform Pcn2 per unit time is larger than the potential change amount of the waveform Pcn1 per unit time. Therefore, in the present embodiment, it is possible to make the speed of an ink droplet ejected from the nozzle N due to being driven by the waveform Pcn2 higher than the speed of an ink droplet ejected from the nozzle N due to being driven by the waveform Pcn1 while preventing the susceptibility to the influence of variations in manufacturing of the piezoelectric element PZ, etc. To make the sum of the period of the waveform Pcn2 and the period of the waveform Pch2 equal to the natural vibration cycle of the ejecting portion D, the period of the waveform Pch2 is different from the period of the waveform Pch1.

Resembling the waveform Pdm1, the waveform Pdm2 is a waveform along which the potential of the drive signal COM changes from the level VH1 to the level VL2 so as to attenuate residual vibration of ink inside the cavity CV by causing the capacity of the cavity CV having been maintained by the waveform Pch2 to expand. However, as described above, the level at the time of end of the waveform Pdm2 is different from the level at the time of end of the waveform Pdm1. For example, the level at the time of end of the waveform Pdm2 is the level VL2, which is lower than the reference level V0, namely, the level at the time of end of the waveform Pdm1. That is, the reference level V0 is a level between the level VH1, at which the potential of the drive signal COM lies when the waveform Pdm2 starts, and the level VL2, at which the potential of the drive signal COM lies when the waveform Pdm2 ends.

In the present embodiment, since the level VL2 at the time of end of the waveform Pdm2 is lower than the reference level V0, namely, the level at the time of end of the waveform Pdm1, it is possible to attenuate the residual vibration of ink inside the cavity CV efficiently. For example, when a temperature of ink present inside the ejecting portion D is relatively high, the viscosity of the ink will be lower than when the temperature of ink present inside the ejecting portion D is relatively low. Therefore, the level VL2 at the time of end of the waveform Pdm2 may be adjusted to be lower when the temperature of ink present inside the ejecting portion D is high than when the temperature of ink present inside the ejecting portion D is low.

The waveform Pdh is a waveform for keeping the position of the piezoelectric element PZ in the Z direction. For example, among the plurality of elements making up the pulse of the waveform PD2, the waveform Pdh corresponds to an expansion maintaining element for maintaining the potential of the drive signal COM in order to drive the piezoelectric element PZ such that the capacity of the cavity CV having been expanded by the waveform Pdm2 will be maintained. In the example illustrated in FIG. 6, the waveform Pdh is a waveform along which the potential of the drive signal COM is kept at the level VL2, which is a level at the time of end of the waveform Pdm2. The waveform Pdh is an example of an "expansion maintaining waveform".

The waveform Prn is a waveform along which the potential of the drive signal COM changes from the level VL2, which is a level at the time of end of the waveform Pdh, to the reference level V0. A potential change amount of the waveform Prn per unit time is smaller than a potential change amount of the waveform Pdm2 per unit time.

For example, at a timing that corresponds to the length of the waveform Pdh, vibration of ink inside the cavity CV that has occurred before the end of the waveform Pdm2 is combined with vibration that is generated by the waveform Prn. That is, the piezoelectric element PZ[m] attenuates the vibration of ink inside the cavity CV by causing the capacity of the cavity CV to contract in accordance with a potential change caused by the waveform Prn. As described above, in the present embodiment, since the waveform PD2 includes the waveforms Pdm2 and Prn, vibration damping for attenuating residual vibration of ink inside the cavity CV is performed in two steps. Therefore, in the present embodiment, it is possible to reduce the influence of vibration of ink occurring inside the cavity CV in the current unit period TP on ink-droplet ejection in the next unit period TP and thus enhance ink-droplet ejection stability at a high frequency. The capacity of the cavity CV at the time of end of the waveform PD2 returns to the capacity of the cavity CV in a default state because, for example, the potential of the drive signal COM at the time of end of the waveform Prn is the reference level V0.

In the present embodiment, since the potential change amount of the waveform Prn per unit time is smaller than the potential change amount of the waveform Pdm2 per unit time, it is possible to make vibration of ink caused by the waveform Prn inside the cavity CV small. Therefore, in the present embodiment, it is possible to reduce an influence of residual vibration caused by the waveform PD2 of the current unit period TP on ink-droplet ejection performed by means of the waveform PD1 of the next unit period TP, thereby suppressing instability in ink-droplet ejection. That is, in the present embodiment, it is possible to ensure that an ink droplet will be ejected stably. The waveform Prn is an example of a "return waveform".

In addition, in the present embodiment, since the waveform PD2 includes the waveforms Pdm2 and Prn, vibration damping for attenuating residual vibration of ink inside the cavity CV is performed in two steps. Therefore, in the present embodiment, it is possible to attenuate residual vibration that has occurred in the current unit period TP sufficiently before the next unit period TP starts. For example, in the present embodiment, even when the drive cycle of the piezoelectric element PZ varies, since the influence of residual vibration occurring in the current unit period TP on ink-droplet ejection in the next unit period TP is small, it is possible to enhance ink-droplet ejection stability. As described above, in the present embodiment, it is possible to reduce the influence of residual vibration occurring in the current unit period TP on ink-droplet ejection in the next unit period TP and thus enhance ink-droplet ejection stability at a high frequency.

Next, with reference to FIG. 7, the results of an ink-ejection experiment conducted while changing the period Tco1 of the waveform PCO1 will now be explained.

FIG. 7 is a diagram for explaining the results of an ink-ejection experiment conducted while changing the interval between the preceding waveform PD1 and the succeeding waveform PD2. That is, FIG. 7 is a diagram for explaining the results of an ink-ejection experiment conducted while changing the period Tco1 of the waveform PCO1.

In FIG. 7, "PERIOD OF CONNECTION WAVEFORM" shows a ratio of the length of the period Tco1 of the waveform PCO1 to the natural vibration cycle of the ejecting portion D.

In FIG. 7, "STABILITY OF SECOND SHOT" shows the stability of ejection of an ink droplet due to being driven by the waveform PD2. For example, in "STABILITY OF SECOND SHOT" in FIG. 7, Grade A shows that the ejection of an ink droplet due to being driven by the waveform PD2 is stable. The term "stable" means that the direction in which an ink droplet was ejected is almost the same as a predetermined direction. In "STABILITY OF SECOND SHOT" of FIG. 7, Grade B shows that the stability of ejection of an ink droplet due to being driven by the waveform PD2 is within a tolerable range. The meaning of "stability is within a tolerable range" is that, for example, a deviation in the direction of ejection of an ink droplet from a predetermined direction is within a tolerable range. In "STABILITY OF SECOND SHOT" of FIG. 7, Grade D shows that the stability of ejection of an ink droplet due to being driven by the waveform PD2 is not within a tolerable range. The meaning of "stability is not within a tolerable range" is that, for example, a deviation in the direction of ejection of an ink droplet from a predetermined direction is not within a tolerable range.

In "MERGING" of FIG. 7, Grade A shows that the second ink droplet ejected due to being driven by the waveform Pcn2 merged with the first ink droplet ejected due to being driven by the waveform Pcn1 within a distance of 0.5 mm from the nozzle surface. In "MERGING" of FIG. 7, Grade B shows that the second ink droplet ejected due to being driven by the waveform Pcn2 merged with the first ink droplet ejected due to being driven by the waveform Pcn1 within a distance of 1 mm from the nozzle surface. In "MERGING" of FIG. 7, Grade C shows that the second ink droplet ejected due to being driven by the waveform Pcn2 did not merge with the first ink droplet ejected due to being driven by the waveform Pcn1 within a distance of 1 mm from the nozzle surface.

As shown by "STABILITY OF SECOND SHOT" in FIG. 7, when the period Tco1 of the waveform PCO1 is 0.7 or less times as long as the natural vibration cycle of the ejecting portion D, a deviation in the direction of ejection of an ink droplet due to being driven by the waveform PD2 from a predetermined direction is not within a tolerable range. When the period Tco1 of the waveform PCO1 is 0.8 or more times as long as the natural vibration cycle of the ejecting portion D, the stability of ejection of an ink droplet due to being driven by the waveform PD2 is within a tolerable range. When the period Tco1 of the waveform PCO1 is 1.0 or more times as long as the natural vibration cycle of the ejecting portion D, the ejection of an ink droplet due to being driven by the waveform PD2 is stable.

As shown by "MERGING" in FIG. 7, when the period Tco1 of the waveform PCO1 is 0.6 or less times as long as the natural vibration cycle of the ejecting portion D, the second ink droplet ejected due to being driven by the waveform Pcn2 does not merge with the first ink droplet ejected due to being driven by the waveform Pcn1 within a distance of 1 mm from the nozzle surface. When the period Tco1 of the waveform PCO1 is 0.7 or more times as long as the natural vibration cycle of the ejecting portion D but 1.1 or less times as long as the natural vibration cycle of the ejecting portion D, the second ink droplet ejected due to being driven by the waveform Pcn2 merges with the first ink droplet ejected due to being driven by the waveform Pcn1 within a distance of 0.5 mm from the nozzle surface. When the period Tco1 of the waveform PCO1 is 1.2 times as long as the natural vibration cycle of the ejecting portion, the second ink droplet ejected due to being driven by the waveform Pcn2 merges with the first ink droplet ejected due to being driven by the waveform Pcn1 within a distance of 1 mm from the nozzle surface. When the period Tco1 of the waveform PCO1 is 1.3 or more times as long as the natural vibration cycle of the ejecting portion D, the second ink droplet ejected due to being driven by the waveform Pcn2 does not merge with the first ink droplet ejected due to being driven by the waveform Pcn1 within a distance of 1 mm from the nozzle surface.

When the stability of ejection of the second ink droplet due to being driven by the waveform PD2 is focused on, it is preferable if the period Tco1 of the waveform PCO1 is 0.8 or more times as long as the natural vibration cycle of the ejecting portion D. It is more preferable if the period Tco1 of the waveform PCO1 is one or more times as long as the natural vibration cycle of the ejecting portion D. As described above, in the present embodiment, by lengthening the period of the waveform PCO1, it is possible to attenuate residual vibration caused by the waveform PD1 sufficiently before the next waveform PD2 starts, thereby enhancing the stability of ejection of an ink droplet due to being driven by the waveform PD2. By this means, in the present embodiment, even when the drive cycle of the piezoelectric element PZ varies, it is possible to reduce the influence of residual vibration occurring in the current unit period TP on ink-droplet ejection in the next unit period TP, and thus to enhance ink-droplet ejection stability at a high frequency. Moreover, with the merging of the second ink droplet ejected due to being driven by the waveform Pcn2 with the first ink droplet ejected due to being driven by the waveform Pcn1 considered, it is preferable if the period Tco1 of the waveform PCO1 is 1.2 or less times as long as the natural vibration cycle of the ejecting portion D.

As described above, in the present embodiment, the ink-jet printer 1 includes the plurality of ejecting portions D and the drive signal generation unit 4. Each of the plurality of ejecting portions D includes the nozzle N, from which ink is ejected, the cavity CV, which is in communication with the nozzle N, and the piezoelectric element PZ. The drive signal generation unit 4 generates, as the drive signal COM of the piezoelectric element PZ, a signal for ejecting a plurality of ink droplets from the nozzle N such that the ink droplets will merge together before landing onto a surface of the recording paper P. The drive signal COM includes the plurality of waveforms PD, which cause pressure changes in ink present inside the cavity CV, and the waveform PCO1, which is continuous from the second-to-last waveform PD1 and continuous to the last waveform PD2 among the plurality of waveforms PD and along which the potential of the drive signal COM is kept at the reference level V0. Each of the plurality of waveforms PD includes the waveform Pep, along which the potential of the drive signal COM changes from the reference level V0 such that the capacity of the cavity CV will expand, and the waveform Pcn, along which the potential of the drive signal COM changes so as to eject an ink droplet from the nozzle N by causing the capacity of the cavity CV expanded by the waveform Pep to contract. Pressure changes caused by the waveform Pcn of the last waveform PD2 in ink present inside the cavity CV are larger than pressure changes caused by the waveform Pcn of the second-to-last waveform PD1 in the ink present inside the cavity CV. The period of the waveform PCO1 is 0.8 or more times as long as the natural vibration cycle of the ejecting portion D.

As described above, in the present embodiment, pressure changes caused by the waveform Pcn, which is a waveform for ejecting ink from the nozzle N, of the last waveform PD2 in ink present inside the cavity CV are larger than pressure changes caused by the waveform Pcn of the second-to-last waveform PD1 in the ink present inside the cavity CV. Therefore, in the present embodiment, it is possible to make the speed of an ink droplet ejected from the nozzle N due to being driven by the waveform Pcn2 of the last waveform PD2 higher than the speed of an ink droplet ejected from the nozzle N due to being driven by the waveform Pcn1 of the second-to-last waveform PD1. Therefore, in the present embodiment, it is possible to reduce the occurrence of non-merging of an ink droplet ejected from the nozzle N due to being driven by the waveform Pcn2 with an ink droplet ejected from the nozzle N due to being driven by the waveform Pcn1 before landing onto a surface of the recording paper P.

Moreover, in the present embodiment, since the period of the waveform PCO1 is 0.8 or more times as long as the natural vibration cycle of the ejecting portion D, it is possible to attenuate residual vibration caused by the waveform PD1 sufficiently before the waveform PD2 starts. Therefore, in the present embodiment, it is possible to reduce an influence of residual vibration caused by the waveform PD1 on ink-droplet ejection performed by means of the waveform PD2 subsequent to the waveform PD1, thereby suppressing instability in ink-droplet ejection performed by means of the waveform PD2. In this way, in the present embodiment, it is possible to enhance ink-droplet ejection stability.

In the present embodiment, the potential of the drive signal COM at the time of end of the waveform Pcn of the last waveform PD2 is the same in level as the potential of the drive signal COM at the time of end of the waveform Pcn of the second-to-last waveform PD1, and the potential change amount of the waveform Pcn per unit time of the last waveform PD2 is larger than the potential change amount of the waveform Pcn per unit time of the second-to-last waveform PD1. Therefore, in the present embodiment, it is possible to make the speed of the ink droplet ejected last higher than the speed of the second-to-last ink droplet without any difference between the potential change amount of the waveform Pcn of the last waveform PD2 and the potential change amount of the waveform Pcn of the second-to-last waveform PD1.

For example, when the potential change amount of the waveform Pcn of the last waveform PD2 is the same as the potential change amount of the waveform Pcn of the second-to-last waveform PD1, the voltage applied to the piezoelectric element PZ by the waveform Pcn of the last waveform PD2 is the same as the voltage applied to the piezoelectric element PZ by the waveform Pcn of the second-to-last waveform PD1. In other words, when the potential change amount of the waveform Pcn of the last waveform PD2 is different from the potential change amount of the waveform Pcn of the second-to-last waveform PD1, the voltage applied to the piezoelectric element PZ by the waveform Pcn of the last waveform PD2 is different from the voltage applied to the piezoelectric element PZ by the waveform Pcn of the second-to-last waveform PD1. When the voltage applied to the piezoelectric element PZ by the waveform Pcn of the last waveform PD2 is different from the voltage applied to the piezoelectric element PZ by the waveform Pcn of the second-to-last waveform PD1, it is more susceptible to the influence of variations in manufacturing of the piezoelectric element PZ, etc. That is, when the voltage applied to the piezoelectric element PZ by the waveform Pcn of the last waveform PD2 is the same as the voltage applied to the piezoelectric element PZ by the waveform Pcn of the second-to-last waveform PD1, it is less susceptible to the influence of variations in manufacturing of the piezoelectric element PZ, etc. Therefore, in the present embodiment, it is possible to make the speed of an ink droplet ejected from the nozzle N due to being driven by the waveform Pcn2 higher than the speed of an ink droplet ejected from the nozzle N due to being driven by the waveform Pcn1 while preventing the susceptibility to the influence of variations in manufacturing of the piezoelectric element PZ, etc.

In the present embodiment, the second-to-last waveform PD1 further includes the waveform Pch1, along which the potential of the drive signal COM is kept at the level VH1, which is a level at the time of end of the waveform Pcn1, so as to maintain the capacity of the cavity CV contracted by the waveform Pcn1, and the waveform Pdm1, along which the potential of the drive signal COM changes to the reference level V0 so as to attenuate residual vibration of ink present inside the cavity CV by causing the capacity of the cavity CV maintained by the waveform Pch1 to expand. In the second-to-last waveform PD1, the period Tsm, which is equal to a sum of the period Tcn1 of the waveform Pcn1 and the period Tch1 of the waveform Pch1, is the same in length as the natural vibration cycle of the ejecting portion D.

As described above, in the present embodiment, the period Tsm, which is equal to a sum of the period Tcn1 of the waveform Pcn1 and the period Tch1 of the waveform Pch1, is the same in length as the natural vibration cycle of the ejecting portion D. Therefore, in the present embodiment, the interval from the timing of start of the waveform Pcn1 to the timing of start of the waveform Pdm1 is the same in length as the natural vibration cycle of the ejecting portion D. Therefore, it is possible to attenuate the vibration of ink inside the cavity CV efficiently.

In the present embodiment, the period of the waveform PCO1 may be one or more times as long as the natural vibration cycle of the ejecting portion D. In this case, it is possible to attenuate residual vibration caused by the waveform PD1 sufficiently before the next waveform PD2 starts, thereby enhancing the stability of ejection of an ink droplet due to being driven by the waveform PD2.

In the present embodiment, the period of the waveform PCO1 may be 1.2 or less times as long as the natural vibration cycle of the ejecting portion D. In this case, it is possible to reduce the occurrence of non-merging of an ink droplet ejected from the nozzle N due to being driven by the waveform Pcn2 with an ink droplet ejected from the nozzle N due to being driven by the waveform Pcn1 before landing onto a surface of the recording paper P.

In the present embodiment, the last waveform PD2 further includes the waveform Pch2, along which the potential of the drive signal COM is kept at the level VH1, which is a level at the time of end of the waveform Pcn2, so as to maintain the capacity of the cavity CV contracted by the waveform Pcn2, and the waveform Pdm2, along which the potential of the drive signal COM changes so as to attenuate residual vibration of ink inside the cavity CV by causing the capacity of the cavity CV maintained by the waveform Pch2 to expand. The reference level V0 is a level between the level VH1, at which the potential of the drive signal COM lies when the waveform Pdm2 starts, and the level VL2, at which the potential of the drive signal COM lies when the waveform Pdm2 ends.

As described above, in the present embodiment, the potential change amount of the waveform Pdm2 is larger than the potential change amount from the level VH1 to the reference level V0. Therefore, in the present embodiment, as compared with a configuration in which the potential change amount of the waveform Pdm corresponding to a vibration damping element is larger than the potential change amount from the level VH1 to the reference level V0, it is possible to attenuate the residual vibration of ink inside the cavity CV more efficiently. For example, in the present embodiment, the potential change amount of the waveform Pdm2 may be adjusted to be larger when the temperature of ink present inside the ejecting portion D is high than when the temperature of ink present inside the ejecting portion D is low.

In the present embodiment, the last waveform PD2 further includes the waveform Pdh, along which the potential of the drive signal COM is kept at the level VL2, which is a level at the time of end of the waveform Pdm2, so as to maintain the capacity of the cavity CV expanded by the waveform Pdm2, and the waveform Prn, along which the potential of the drive signal COM changes from the level VL2, which is a level at the time of end of the waveform Pdh, to the reference level V0, and the potential change amount of which per unit time is smaller than the potential change amount of the waveform Pdm2 per unit time.

As described above, in the present embodiment, in the last waveform PD2, vibration damping for attenuating residual vibration of ink inside the cavity CV is performed in two steps by means of the waveforms Pdm2 and Prn. Therefore, in the present embodiment, it is possible to attenuate the vibration of ink caused by the waveform PD2 inside the cavity CV efficiently. Consequently, in the present embodiment, for example, it is possible to enhance ink-droplet ejection stability at a high frequency.

In the present embodiment, since the potential change amount of the waveform Prn per unit time is smaller than the potential change amount of the waveform Pdm2 per unit time, it is possible to make vibration of ink caused by the waveform Prn inside the cavity CV small. Therefore, in the present embodiment, it is possible to attenuate residual vibration caused by the waveform PD2 sufficiently. Consequently, in the present embodiment, even when the drive signal COM including the waveforms PD1 and PD2 is supplied repeatedly in a predetermined drive cycle, it is possible to suppress instability in ink-droplet ejection.

Second Embodiment

Figure 8:
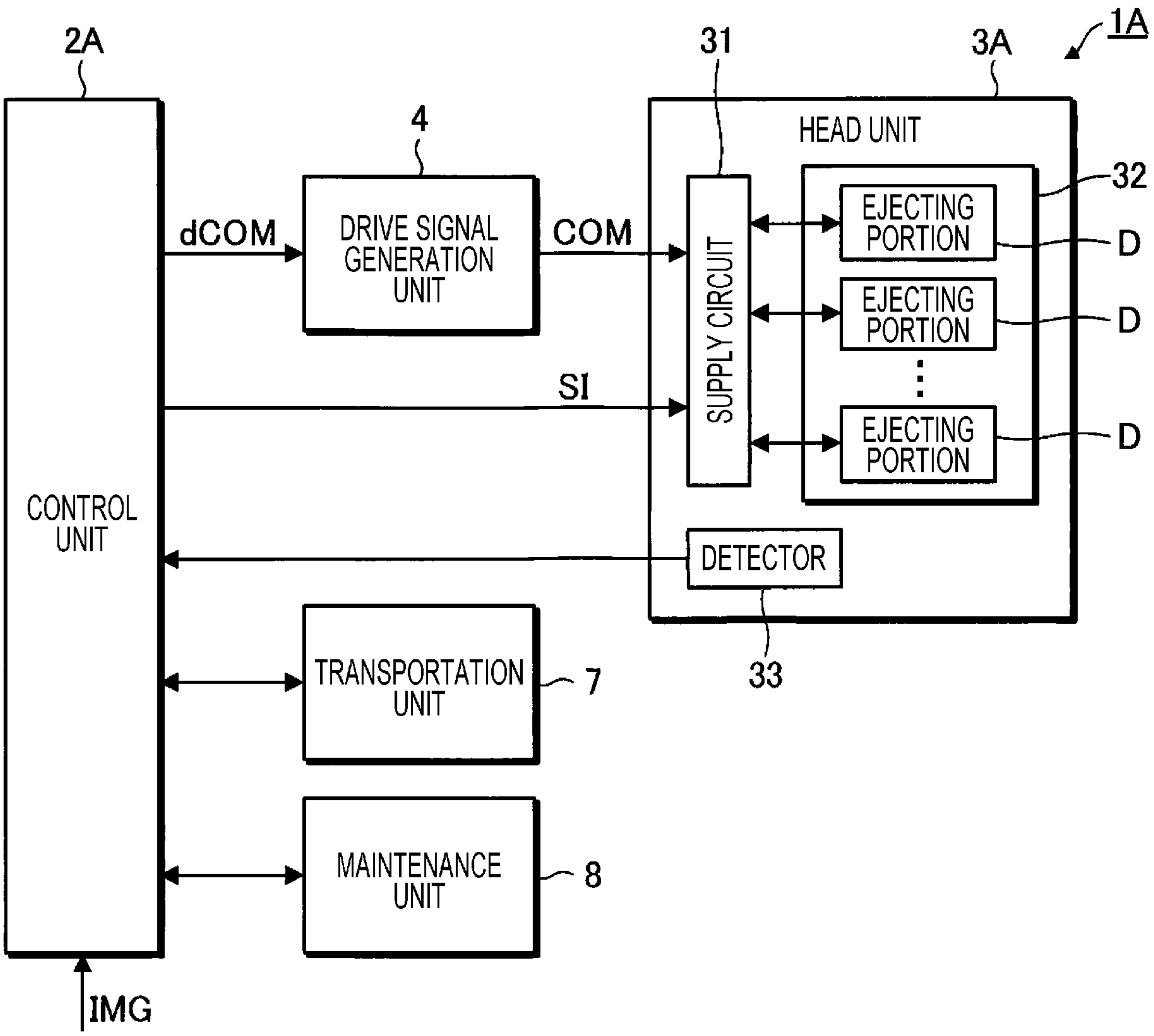
FIG. 8 is a block diagram illustrating an example of a configuration of an ink-jet printer according to a second embodiment.

FIG. 8 is a block diagram illustrating an example of a configuration of an ink-jet printer 1A according to a second embodiment. The same reference numerals as those used in the description and illustration of the foregoing embodiment will be assigned to elements that are the same as, or similar to, those having been explained with reference to FIGS. 1 to 7, and a detailed explanation of them is omitted.

The ink-jet printer 1A is the same as the ink-jet printer 1 except that it includes a control unit 2A and a head unit 3A in place of the control unit 2 and the head unit 3, which have been described with reference to FIG. 1. For example, the ink-jet printer 1A includes the control unit 2A, the head unit 3A, the drive signal generation unit 4, the transportation unit 7, and the maintenance unit 8.

The head unit 3A is the same as the head unit 3 except that it includes a detector 33. For example, the head unit 3A includes the supply circuit 31, the recording head 32, and the detector 33 configured to detect a temperature corresponding to a temperature of ink present inside the ejecting portion D.

The detector 33 is, for example, a temperature sensor configured to detect a temperature of the recording head 32. For example, the detector 33 detects the temperature of the recording head 32 and outputs temperature information that indicates the detected temperature to the control unit 2A. The detector 33 is an example of a “temperature detector”. The temperature of the recording head 32 is the temperature corresponding to the temperature of ink present inside the ejecting portion D.

For example, a single temperature sensor may be provided as the detector 33 on the recording head 32. Alternatively, a plurality of temperature sensors may be provided as the detector 33 on the recording head 32. When a plurality of temperature sensors is provided on the recording head 32, each temperature sensor may be provided individually for the corresponding one of the ejecting portions D or may be provided for two or more but not more than M ejecting portions D among the M number of the ejecting portions D. In addition, when a plurality of temperature sensors is provided on the recording head 32, for example, the temperature of the recording head 32 may be an average value of detection results of the plurality of temperature sensors, or a maximum value or a minimum value among the detection results of the plurality of temperature sensors. In the present embodiment, it is possible to detect the temperature of ink present inside the ejecting portion D indirectly by detecting the temperature of the recording head 32. The detector 33 may detect the temperature of ink present inside the ejecting portion D directly.

Based on the temperature detected by the detector 33, the control unit 2A adjusts the waveform PD2, etc., specified by the waveform specifying signal dCOM. Based on the waveform specifying signal dCOM specifying the waveform PD2, etc. adjusted based on the temperature detected by the detector 33, the drive signal generation unit 4 adjusts the waveform PD2, etc. of the drive signal COM.

For example, the control unit 2A adjusts the waveform PD2 such that the level VL2, which is a level at the time of end of the waveform Pdm2, will be lower when the temperature detected by the detector 33 is a second temperature, which is higher than a first temperature, than when the temperature detected by the detector 33 is the first temperature. That is, the difference between the level at which the potential of the drive signal COM lies when the waveform Pdm2 starts and the level at which the potential of the drive signal COM lies when the waveform Pdm2 ends is adjusted such that the difference will be greater when the temperature detected by the detector 33 is the second temperature than when the temperature detected by the detector 33 is the first temperature.

For example, when a temperature of ink present inside the ejecting portion D is relatively high, the viscosity of the ink will be lower than when the temperature of ink present inside the ejecting portion D is relatively low; therefore, vibration of the ink inside the cavity CV will be greater. In the present embodiment, it is possible to adjust the potential change amount of the waveform Pdm2 in accordance with the temperature of ink present inside the ejecting portion D; therefore, even when the temperature of ink present inside the ejecting portion D changes, it is possible to attenuate the vibration of the ink inside the cavity CV sufficiently. Therefore, in the present embodiment, even when the temperature of ink present inside the ejecting portion D changes, it is possible to reduce the influence of residual vibration occurring in the current unit period TP on ink-droplet ejection in the next unit period TP, and thus to enhance ink-droplet ejection stability.

The control unit 2A may, based on the temperature detected by the detector 33, adjust the period Tco1 of the waveform PCO1. For example, the control unit 2A may make the period Tco1 of the waveform PCO1 longer when the temperature detected by the detector 33 is the second temperature than when the temperature detected by the detector 33 is the first temperature.

As described above, in the present embodiment, the ink-jet printer 1 further includes the detector 33 that detects a temperature corresponding to a temperature of ink present inside the ejecting portion D. In addition, the difference between the level at which the potential of the drive signal COM lies when the waveform Pdm2 starts and the level at which the potential of the drive signal COM lies when the waveform Pdm2 ends is adjusted such that the difference will be greater when the temperature detected by the detector 33 is the second temperature, which is higher than the first temperature, than when the temperature detected by the detector 33 is the first temperature.

As described above, in the present embodiment, it is possible to adjust the potential change amount of the waveform Pdm2 in accordance with the temperature of ink present inside the ejecting portion D; therefore, even when the temperature of ink present inside the ejecting portion D changes, it is possible to attenuate the vibration of the ink inside the cavity CV sufficiently. Consequently, in the present embodiment, it is possible to enhance ink-droplet ejection stability even when the temperature of ink present inside the ejecting portion D changes.

2. Modification Examples

The exemplary embodiments described above can be modified in various ways. Some specific examples of modification are described below. Any two or more modification examples selected from among the examples described below may be combined as long as they are not contradictory to each other or one another. In each modification example described below, the same reference numerals as those used in the description and illustration of the foregoing embodiments will be assigned to elements that are equivalent to those in the foregoing embodiments in terms of operation and/or function, and a detailed explanation of them is omitted.

First Modification Example

In the foregoing embodiment, a case where the drive signal COM includes two waveforms PD provided in the unit period TP has been described as an example. However, the scope of the present disclosure is not limited to such an exemplary configuration. For example, the drive signal COM may include three or more waveforms PD provided in the unit period TP.

Figure 9:
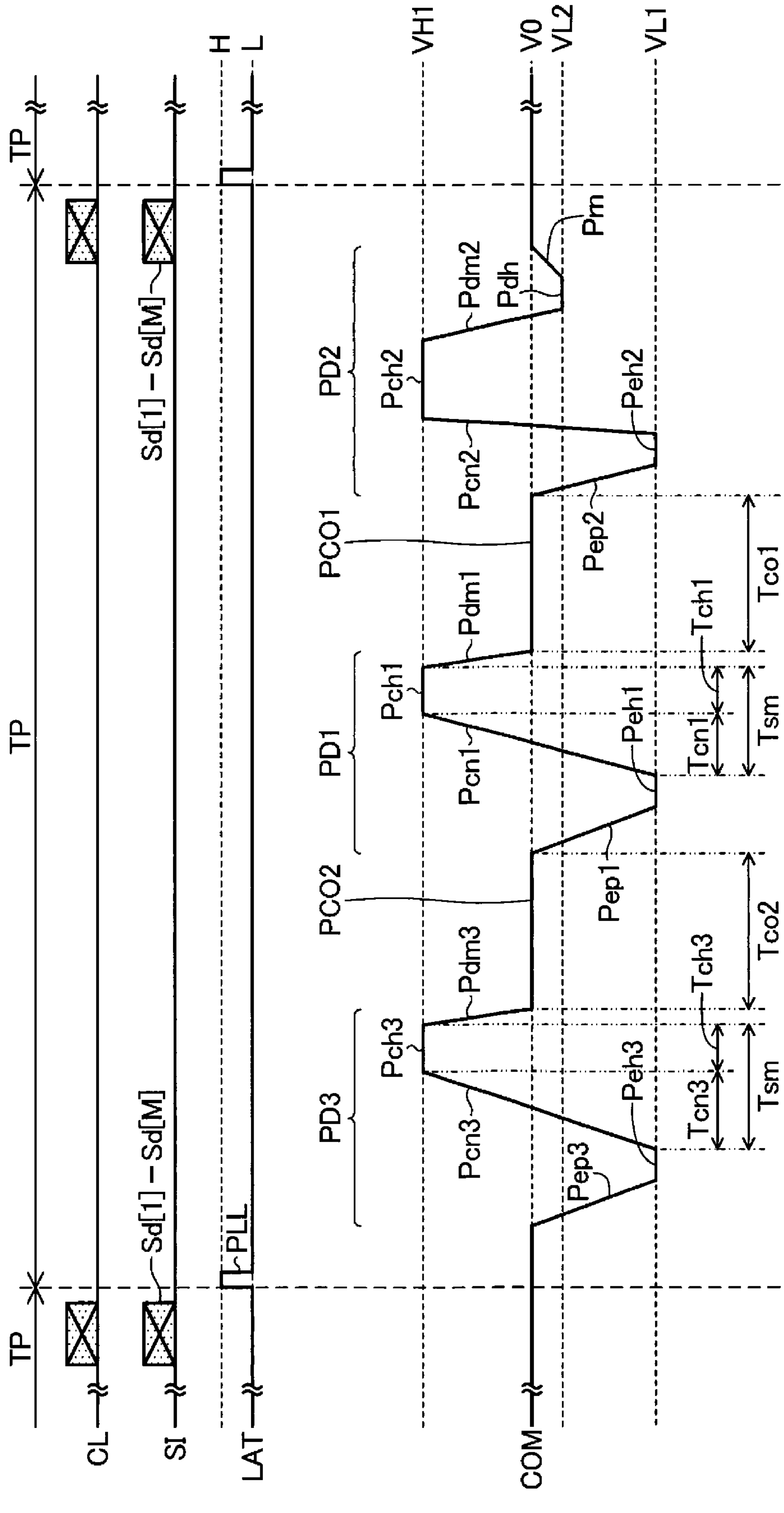
FIG. 9 is a timing chart for explaining an example of the drive signal according to a first modification example.

FIG. 9 is a timing chart for explaining an example of the drive signal COM according to a first modification example. The same reference numerals as those used in the description and illustration of the foregoing embodiments will be assigned to elements that are the same as, or similar to, those having been explained with reference to FIGS. 1 to 8, and a detailed explanation of them is omitted. In FIG. 9, it is assumed that three ink droplets are ejected from the nozzle N within the same unit period TP, and these three ink droplets merge together before landing onto a surface of the recording paper P, thereby forming a single dot on the recording paper P.

The drive signal COM illustrated in FIG. 9 is the same as the drive signal COM illustrated in FIG. 6, except that a waveform PD3 and a waveform PCO2 are added to drive signal COM illustrated in FIG. 6. For example, the drive signal COM includes the waveforms PD1, PD2, and PD3, which cause pressure changes in ink present inside the cavity CV, the waveform PCO1, which is continuous from the waveform PD1 and continuous to the waveform PD2, and the waveform PCO2, which is continuous from the waveform PD3 and continuous to the waveform PD1. For example, the waveform PD3 is a waveform anterior to the waveform PD1. The waveforms PD1, PD2, and PD3 constitute an example of a "plurality of drive waveforms". The waveform PD3 is an example of a "drive waveform that is not the last drive waveform nor the second-to-last drive waveform among the plurality of drive waveforms". The waveform PCO2 is an example of a "second connection waveform". In the description below, the waveforms PD1, PD2, and PD3 will be referred to also as a waveform PD without making a distinction among them.

The waveform PD3 is a waveform for ejecting ink droplets from the nozzle N, similarly to the waveform PD1. For example, an ink droplet ejected from the nozzle N due to being driven by the waveform PD3 and an ink droplet ejected from the nozzle N due to being driven by the waveform PD1 and an ink droplet ejected from the nozzle N due to being driven by the waveform PD2 within the same unit period TP merge together before landing onto a surface of the recording paper P.

For example, the waveform PD3 is a waveform that is similar to the waveform PD1. Specifically, the waveform PD3 is a waveform specifying that the potential of the drive signal COM changes from the reference level V0 to the level VL1, next to the level VH1, and then returns to the reference level V0. For example, the waveform PD3 includes a waveform Pep3 that is similar to the waveform Pep1, a waveform Peh3 that is similar to the waveform Peh1, a waveform Pcn3 that is similar to the waveform Pcn1, a waveform Pch3 that is similar to the waveform Pch1, and a waveform Pdm3 that is similar to the waveform Pdm1.

Therefore, an explanation of the waveform PD3 can be given by reading the foregoing description of the waveform PD1 given with reference to FIG. 6 while replacing the waveforms PD1, Pep1, Peh1, Pcn1, Pch1, and Pdm1 with the waveforms PD3, Pep3, Peh3, Pcn3, Pch3, and Pdm3 respectively. However, a potential change amount of the waveform Pcn3 per unit time is smaller than a potential change amount of the waveform Pcn1 per unit time. That is, the potential change amount of the waveform Pcn1 per unit time is larger than the potential change amount of the waveform Pcn3 per unit time. Also in the waveform PD3, the period Tsm, which is equal to a sum of a period Tcn3 of the waveform Pcn3 and a period Tch3 of the waveform Pch3, may be the same in length as the natural vibration cycle of the ejecting portion D. The waveform Pep3 is an example of an "expansion waveform". The waveform Pcn3 is an example of a "contraction waveform". The waveform Pch3 is an example of a "third contraction maintaining waveform". The waveform Pdm3 is an example of a "third vibration damping waveform".

Moreover, in this modification example, since the interval between the waveform PD3 and the waveform PD1 is guaranteed by the waveform PCO2, it is possible to attenuate residual vibration caused by the waveform PD3 sufficiently before the waveform PD1 starts. Therefore, in this modification example, it is possible to reduce an influence of residual vibration caused by the waveform PD3 on ink-droplet ejection performed by means of the next waveform PD1, thereby suppressing instability in ink-droplet ejection performed by means of the waveform PD1.

For example, the waveform PCO2 is a waveform along which the potential of the drive signal COM is kept at a level at the time of end of the waveform PD3. The level at the time of end of the waveform PD3 is the reference level V0, which is a level at the time of end of the waveform Pdm3. That is, the waveform PCO2 is a waveform along which the potential of the drive signal COM is kept at the reference level V0. A period Tco2 of the waveform PCO2 is, for example, 0.8 or more times as long as the natural vibration cycle of the ejecting portion D. It is preferable if the period Tco2 of the waveform PCO2 is one or more times as long as the natural vibration cycle of the ejecting portion D. The upper limit of the period Tco2 of the waveform PCO2 is, preferably, 1.2 times as long as the natural vibration cycle of the ejecting portion D.

As described above, in this modification example, the plurality of waveforms PD is comprised of three or more waveforms PD. The waveform PD3, which is not the last waveform PD2 nor the second-to-last waveform PD1 among the plurality of waveforms PD, includes the waveform Pch3, along which the potential of the drive signal COM is kept at the level VH1, which is a level at the time of end of the waveform Pcn3, so as to maintain the capacity of the cavity CV contracted by the waveform Pcn3, and the waveform Pdm3, along which the potential of the drive signal COM changes to the reference level V0 so as to attenuate residual vibration of ink inside the cavity CV by causing the capacity of the cavity CV maintained by the waveform Pch3 to expand. The drive signal COM further includes the waveform PCO2, which is continuous to certain one waveform PD that is not the last waveform PD2 among the plurality of waveforms PD and continuous from a waveform PD anterior to the certain one waveform PD, and along which the potential of the drive signal COM is kept at the reference level V0. The period Tco2 of the waveform PCO2 is 0.8 or more times as long as the natural vibration cycle of the ejecting portion D.

The same effects as those of the foregoing embodiments can be obtained also in this modification example. Moreover, in this modification example, since the period of the waveform PCO2 is 0.8 or more times as long as the natural vibration cycle of the ejecting portion D, it is possible to attenuate residual vibration caused by the waveform PD anterior to the certain one waveform PD sufficiently before the certain one waveform PD starts. Therefore, in this modification example, it is possible to reduce an influence of residual vibration caused by the waveform PD anterior to the certain one waveform PD on ink-droplet ejection performed by means of the certain one waveform PD, thereby suppressing instability in ink-droplet ejection performed by means of the certain one waveform PD. In this way, also in this modification example, it is possible to enhance ink-droplet ejection stability.

Second Modification Example

In the foregoing embodiments and the above modification example, a case where the period Tsm, which is equal to a sum of the period Tcn1 of the waveform Pcn1 and the period Tch1 of the waveform Pch1, is the same in length as the natural vibration cycle of the ejecting portion D has been described as an example. However, the scope of the present disclosure is not limited to such an exemplary configuration. For example, in the waveform PD1, the period Tsm that is equal to a sum of the period Tcn1 of the waveform Pcn1 and the period Tch1 of the waveform Pch1 may be different in length from the natural vibration cycle of the ejecting portion D. Similarly, in the waveform PD3, the period Tsm that is equal to a sum of the period Tcn3 of the waveform Pcn3 and the period Tch3 of the waveform Pch3 may be different in length from the natural vibration cycle of the ejecting portion D. The same effects as those of the foregoing embodiments and the above modification example can be obtained also in this modification example, except for effects obtained from equality in length of the period Tsm and the natural vibration cycle of the ejecting portion D.

Third Modification Example

In the foregoing embodiments and the above modification examples, a case where the potential change amount of the waveform Prn, along which the potential of the drive signal COM changes to the reference level V0, per unit time is smaller than the potential change amount of the waveform Pdm2, which corresponds to a vibration damping element, per unit time has been described as an example. However, the scope of the present disclosure is not limited to such an exemplary configuration. For example, the potential change amount of the waveform Prn per unit time may be equal to the potential change amount of the waveform Pdm2 per unit time. The potential change amount of the waveform Prn per unit time may be larger than the potential change amount of the waveform Pdm2 per unit time. The same effects as those of the foregoing embodiments and the above modification examples can be obtained also in this modification example, except for effects obtained when the potential change amount of the waveform Prn per unit time is smaller than the potential change amount of the waveform Pdm2 per unit time.

Fourth Modification Example

In the foregoing embodiments and the above modification examples, a case where the last waveform PD2 includes the waveforms Pdm2, Pdh, and Prn has been described as an example. However, the scope of the present disclosure is not limited to such an exemplary configuration. For example, the waveform PD2 may have, in place of the waveforms Pdm2, Pdh, and Prn, a waveform along which the potential of the drive signal COM changes from the level VH1, namely, the level at the time of end of the waveform Pch2, to the reference level V0. The same effects as those of the foregoing embodiments and the above modification examples can be obtained also in this modification example, except for effects obtained from performing vibration damping for attenuating residual vibration of ink inside the cavity CV in two steps by means of the waveforms Pdm2 and Prn.

Fifth Modification Example

In the foregoing embodiments and the above modification examples, a case where the piezoelectric element PZ becomes displaced in the −Z direction due to a change in the potential of the individual drive signal Vin[m] from a low level to a high level has been described as an example. However, the scope of the present disclosure is not limited to such an exemplary configuration. For example, a piezoelectric element PZ configured to become displaced in the −Z direction due to a change in the potential of the individual drive signal Vin[m] from a high level to a low level may be used. In this case, for example, the potential of the drive signal COM changes from a low level to a high level at a portion corresponding to the expansion element, and changes from a high level to a low level at a portion corresponding to the contraction element. The same effects as those of the foregoing embodiments and the above modification examples can be obtained also in this modification example.

Sixth Modification Example

In the foregoing embodiments and the above modification examples, a case where each head unit 3 has one nozzle row NL has been described as an example. However, the scope of the present disclosure is not limited to such an exemplary configuration. For example, each head unit 3 may have a plurality of nozzle rows NL. Similarly, each head unit 3A may have a plurality of nozzle rows NL. The same effects as those of the foregoing embodiments and the above modification examples can be obtained also in this modification example.

Seventh Modification Example

In the foregoing embodiments and the above modification examples, a case where the ink-jet printer 1 includes four head units 3 has been described as an example. However, the scope of the present disclosure is not limited to such an exemplary configuration. For example, the ink-jet printer 1 may include one, two, or three head units 3. The ink-jet printer 1 may include five head units 3 or more.

Eighth Modification Example

In the second embodiment described above, a case where the detector 33 that detects the temperature of the recording head 32 has been taken as an example. However, the scope of the present disclosure is not limited to such an exemplary configuration. For example, the head unit 3A may include a viscosity detector that detects a viscosity of ink present inside the nozzle N in addition to the detector 33 or in place of the detector 33. For example, based on a detection signal indicating a potential level of the upper electrode Zu of the piezoelectric element PZ, the viscosity detector detects a viscosity of ink present inside the ejecting portion D. Specifically, based on the detection signal indicating the potential level of the upper electrode Zu of the piezoelectric element PZ, the viscosity detector generates a residual vibration signal. Then, the viscosity detector may detect a relative viscosity in relation to a predetermined viscosity by comparing a feature amount such as cycle and amplitude of the residual vibration signal with a reference feature amount of the residual vibration signal for a case where ink has the predetermined viscosity. The same effects as those of the second embodiment described above can be obtained also in this modification example.

Ninth Modification Example

In the foregoing embodiments and the above modification examples, a case where the ink-jet printer 1 is a serial printer has been described as an example. However, the scope of the present disclosure is not limited to such an exemplary configuration. For example, the ink-jet printer 1 may be a so-called line printer, in which plural nozzles N are arranged in the head unit 3 in a line-extending manner to be wider than the width of the recording paper P. Similarly, the ink-jet printer 1A may be a line printer. The same effects as those of the foregoing embodiments and the above modification examples can be obtained also in this modification example.

Tenth Modification Example

In the foregoing embodiments and the above modification examples, a case where the drive signal COM includes a single drive signal has been described as an example. However, the scope of the present disclosure is not limited to such an exemplary configuration. For example, besides the drive signal COM illustrated in FIG. 6, the drive signal COM may include a drive signal having a waveform different from the waveform PD1 and the waveform PD2 of the drive signal COM. The same effects as those of the foregoing embodiments and the above modification examples can be obtained also in this modification example.

What is claimed is:

1. A liquid ejecting apparatus, comprising:

a plurality of ejecting portions each including a nozzle from which droplet ejects, a pressure compartment that is in communication with the nozzle, and a drive element; and a signal generation unit that is configured to generate, as a drive signal of the drive element, a signal for ejecting a plurality of liquid droplets from the nozzle such that the liquid droplets merge together before landing onto a medium, wherein the drive signal includes a plurality of drive waveforms for causing pressure changes in a liquid present inside the pressure compartment, and a first connection waveform that is continuous from a second-to-last drive waveform and continuous to a last drive waveform among the plurality of drive waveforms and along which a potential of the drive signal is kept at a reference level, each of the plurality of drive waveforms includes an expansion waveform along which the potential of the drive signal changes from the reference level such that capacity of the pressure compartment expands, and a contraction waveform along which the potential of the drive signal changes so as to eject a liquid droplet from the nozzle by causing the capacity of the pressure compartment expanded by the expansion waveform to contract, pressure changes caused by the contraction waveform of the last drive waveform in the liquid present inside the pressure compartment are larger than pressure changes caused by the contraction waveform of the second-to-last drive waveform in the liquid present inside the pressure compartment, and a period of the first connection waveform is 0.8 or more times as long as a natural vibration cycle of the ejecting portion.

2. The liquid ejecting apparatus according to claim 1, wherein the potential of the drive signal at a time of end of the contraction waveform of the last drive waveform is same in level as the potential of the drive signal at a time of end of the contraction waveform of the second-to-last drive waveform, and a potential change amount of the contraction waveform per unit time of the last drive waveform is larger than a potential change amount of the contraction waveform per unit time of the second-to-last drive waveform.

3. The liquid ejecting apparatus according to claim 1, wherein the second-to-last drive waveform further includes a first contraction maintaining waveform along which the potential of the drive signal is kept at a level at a time of end of the contraction waveform so as to maintain the capacity of the pressure compartment contracted by the contraction waveform, and a first vibration damping waveform along which the potential of the drive signal changes to the reference level so as to attenuate residual vibration of the liquid present inside the pressure compartment by causing the capacity of the pressure compartment maintained by the first contraction maintaining waveform to expand, and in the second-to-last drive waveform, a sum of a period of the contraction waveform and a period of the first contraction maintaining waveform is same in length as the natural vibration cycle of the ejecting portion.

4. The liquid ejecting apparatus according to claim 1, wherein the period of the first connection waveform is one or more times as long as the natural vibration cycle of the ejecting portion.

5. The liquid ejecting apparatus according to claim 1, wherein the period of the first connection waveform is 1.2 or less times as long as the natural vibration cycle of the ejecting portion.

6. The liquid ejecting apparatus according to claim 1, wherein the last drive waveform further includes a second contraction maintaining waveform along which the potential of the drive signal is kept at a level at a time of end of the contraction waveform so as to maintain the capacity of the pressure compartment contracted by the contraction waveform, and a second vibration damping waveform along which the potential of the drive signal changes so as to attenuate residual vibration of the liquid present inside the pressure compartment by causing the capacity of the pressure compartment maintained by the second contraction maintaining waveform to expand, and the reference level is a level between a level at which the potential of the drive signal lies when the second vibration damping waveform starts and a level at which the potential of the drive signal lies when the second vibration damping waveform ends.

7. The liquid ejecting apparatus according to claim 6, further comprising:

a temperature detector that is configured to detects a temperature corresponding to a temperature of the liquid present inside the ejecting portion, wherein a difference between the level at which the potential of the drive signal lies when the second vibration damping waveform starts and the level at which the potential of the drive signal lies when the second vibration damping waveform ends is adjusted such that the difference is greater when the temperature detected by the temperature detector is a second temperature, which is higher than a first temperature, than when the temperature detected by the temperature detector is the first temperature.

8. The liquid ejecting apparatus according to claim 6, wherein the last drive waveform further includes an expansion maintaining waveform along which the potential of the drive signal is kept at the level at a time of end of the second vibration damping waveform so as to maintain the capacity of the pressure compartment expanded by the second vibration damping waveform, and a return waveform along which the potential of the drive signal changes from the level at a time of end of the expansion maintaining waveform to the reference level, and a potential change amount of which per unit time is smaller than a potential change amount of the second vibration damping waveform per unit time.

9. The liquid ejecting apparatus according to claim 1, wherein the plurality of drive waveforms is comprised of three or more drive waveforms;

a drive waveform that is not the last drive waveform nor the second-to-last drive waveform among the plurality of drive waveforms includes a third contraction maintaining waveform along which the potential of the drive signal is kept at a level at a time of end of the contraction waveform so as to maintain the capacity of the pressure compartment contracted by the contraction waveform, and a third vibration damping waveform along which the potential of the drive signal changes to the reference level so as to attenuate residual vibration of the liquid present inside the pressure compartment by causing the capacity of the pressure compartment maintained by the third contraction maintaining waveform to expand, the drive signal further includes a second connection waveform that is continuous to certain one drive waveform that is not the last drive waveform among the plurality of drive waveforms and continuous from a drive waveform anterior to the certain one drive waveform and along which the potential of the drive signal is kept at the reference level, and a period of the second connection waveform is 0.8 or more times as long as the natural vibration cycle of the ejecting portion.

10. A method for controlling a liquid ejecting apparatus including a plurality of ejecting portions, each of the plurality of ejecting portions including a nozzle from which droplet ejection is performed, a pressure compartment that is in communication with the nozzle, and a drive element, the method comprising:

generating, as a drive signal of the drive element, a signal for ejecting a plurality of liquid droplets from the nozzle such that the liquid droplets merge together before landing onto a medium, wherein the drive signal includes a plurality of drive waveforms for causing pressure changes in a liquid present inside the pressure compartment, and a first connection waveform that is continuous from a second-to-last drive waveform and continuous to a last drive waveform among the plurality of drive waveforms and along which a potential of the drive signal is kept at a reference level, each of the plurality of drive waveforms includes an expansion waveform along which the potential of the drive signal changes from the reference level such that capacity of the pressure compartment expands, and a contraction waveform along which the potential of the drive signal changes so as to eject a liquid droplet from the nozzle by causing the capacity of the pressure compartment expanded by the expansion waveform to contract, pressure changes caused by the contraction waveform of the last drive waveform in the liquid present inside the pressure compartment are larger than pressure changes caused by the contraction waveform of the second-to-last drive waveform in the liquid present inside the pressure compartment, and a period of the first connection waveform is 0.8 or more times as long as a natural vibration cycle of the ejecting portion.

* * * * *